(12) United States Patent
Oyama et al.

(10) Patent No.: US 6,344,288 B1
(45) Date of Patent: Feb. 5, 2002

(54) LIGHT ABSORPTION ANTIREFLECTIVE BODY AND METHOD OF PRODUCING THE SAME

(75) Inventors: Takuji Oyama; Tomohiro Yamada, both of Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/622,056

(22) PCT Filed: Feb. 24, 1999

(86) PCT No.: PCT/JP99/00841

§ 371 Date: Aug. 24, 2000

§ 102(e) Date: Aug. 24, 2000

(87) PCT Pub. No.: WO99/44080

PCT Pub. Date: Sep. 2, 1999

(30) Foreign Application Priority Data

Feb. 24, 1998 (JP) ............................................. 10-42432

(51) Int. Cl.$^7$ .......................... B32B 19/00; B32B 9/00
(52) U.S. Cl. ...................... 428/701; 428/325; 428/327; 428/336; 428/432; 204/192.1; 427/535
(58) Field of Search ................................. 428/325, 327, 428/336, 701, 702, 432; 204/192.1; 427/535

(56) References Cited

U.S. PATENT DOCUMENTS

| | | |
|---|---|---|
| 5,691,044 A | 11/1997 | Oyama et al. |
| 5,942,319 A | 8/1999 | Oyama et al. |
| 5,976,684 A | 11/1999 | Oyama et al. |

FOREIGN PATENT DOCUMENTS

| | | |
|---|---|---|
| JP | 62-17701 | 1/1987 |
| JP | 1-257801 | 10/1989 |
| JP | 6-208003 | 7/1994 |
| JP | 6-510382 | 11/1994 |
| JP | 10-26704 | 1/1998 |
| JP | 10-186103 | 7/1998 |
| JP | 11-6901 | 1/1999 |

*Primary Examiner*—Deborah Jones
*Assistant Examiner*—Andrew T. Piziali
(74) *Attorney, Agent, or Firm*—Oblon, Spivak, McClelland, Maier & Neustadt, P.C.

(57) ABSTRACT

A light absorptive antireflector comprising a substrate, and a first layer of a light absorptive film, a second layer made of a material which has slight absorption within a visible light region and a third layer made of a material which has a refractive index smaller than 1.55, sequentially formed on the substrate, which has an adequate low reflection performance within a wide range of a wavelength region and which has an electromagnetic shielding ability and a low luminous transmittance suitable for improving the contrast of a display, has freeness in transmittance and reflection color and is excellent also in the productivity, and a method for its production.

13 Claims, 19 Drawing Sheets

F I G. 6
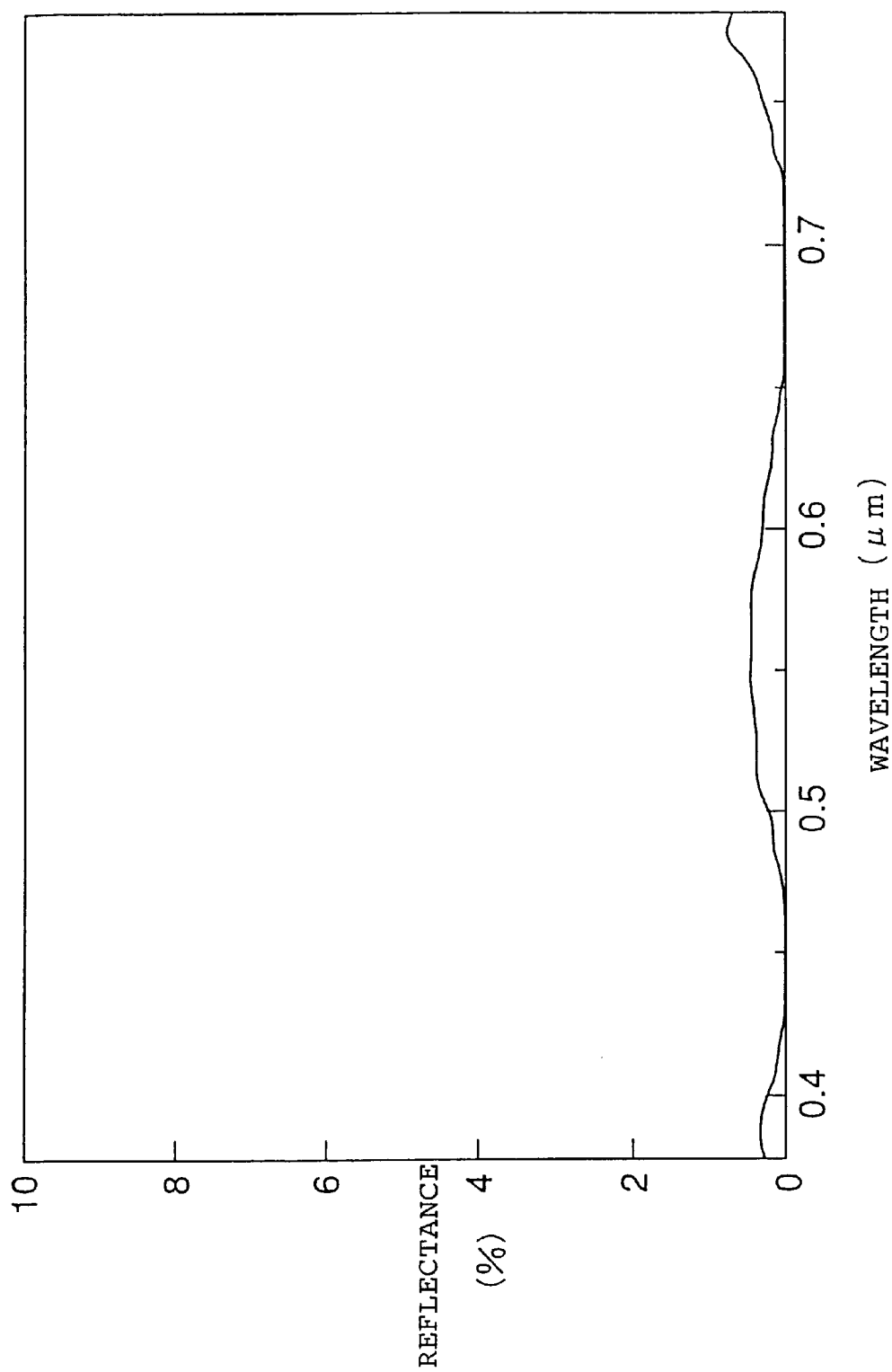

F I G. 12
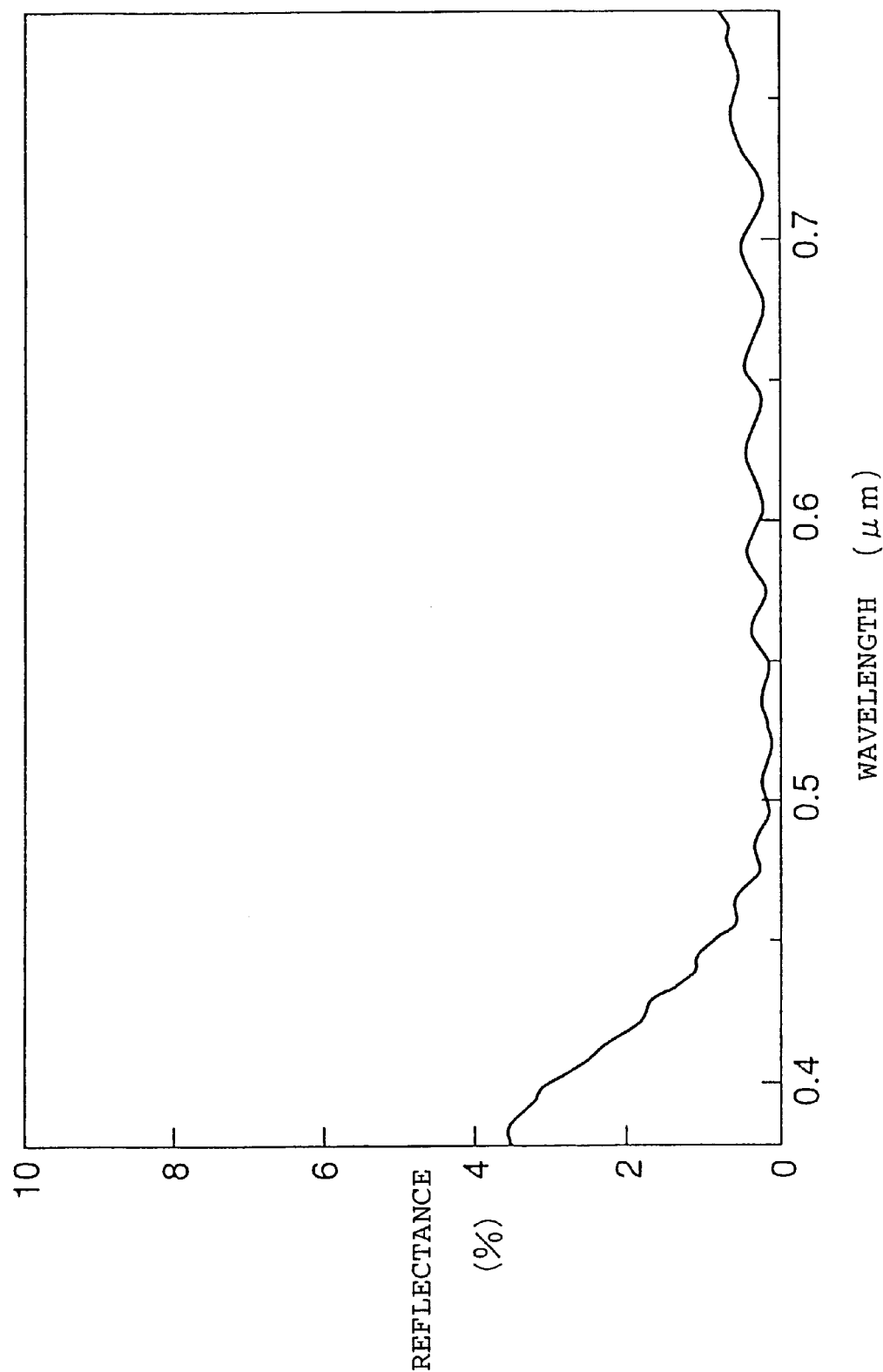

F I G. 13
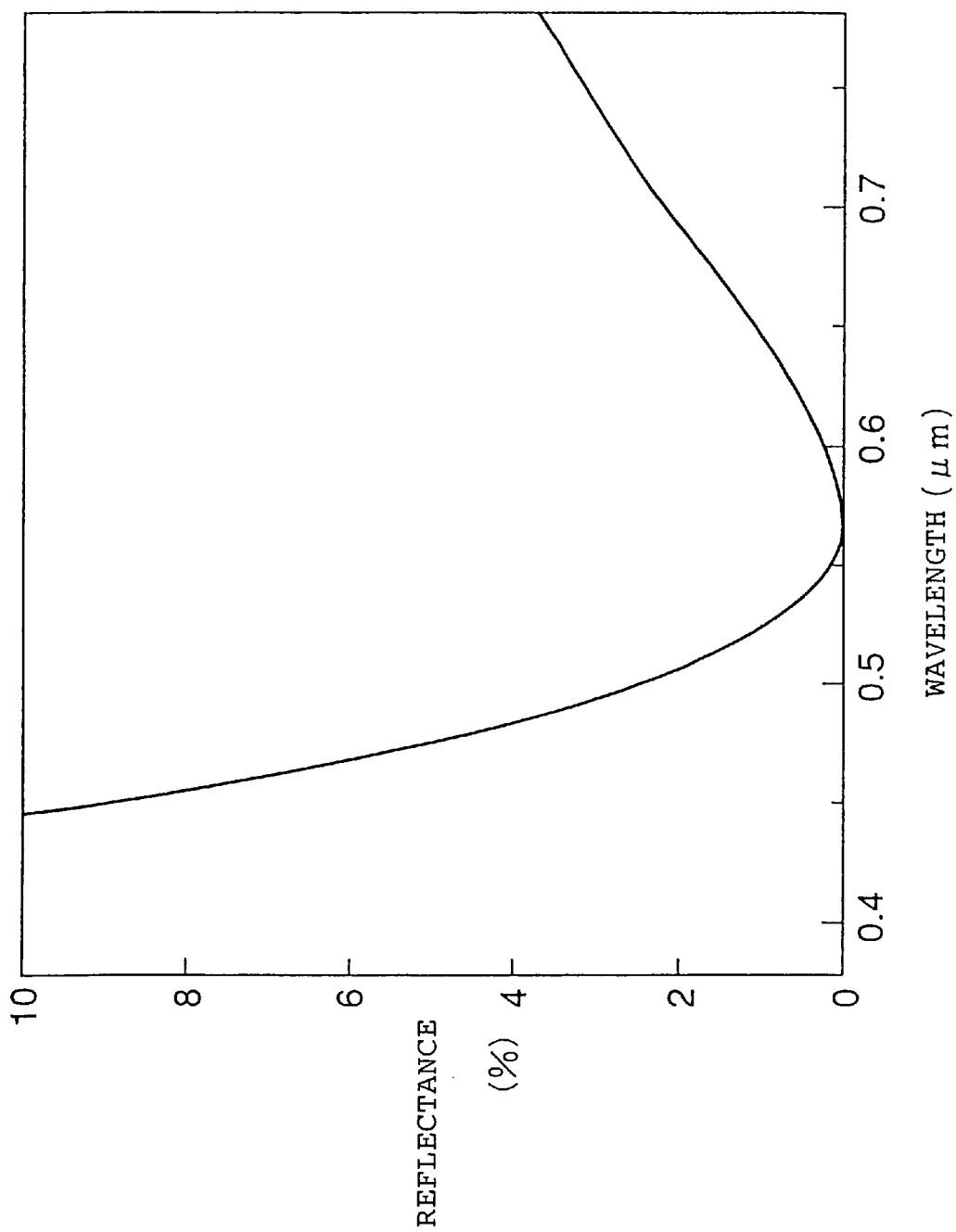

F I G. 14
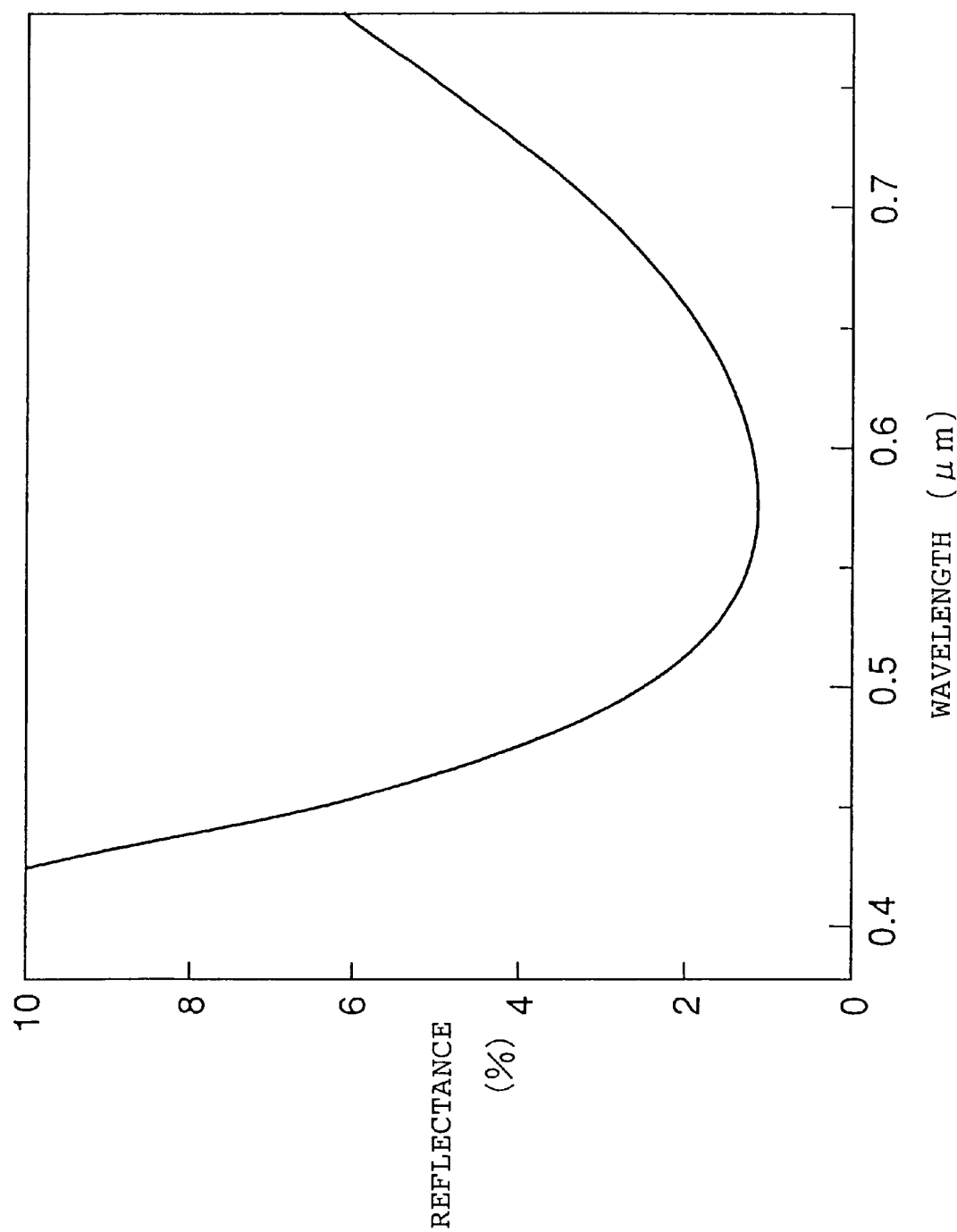

F I G. 15
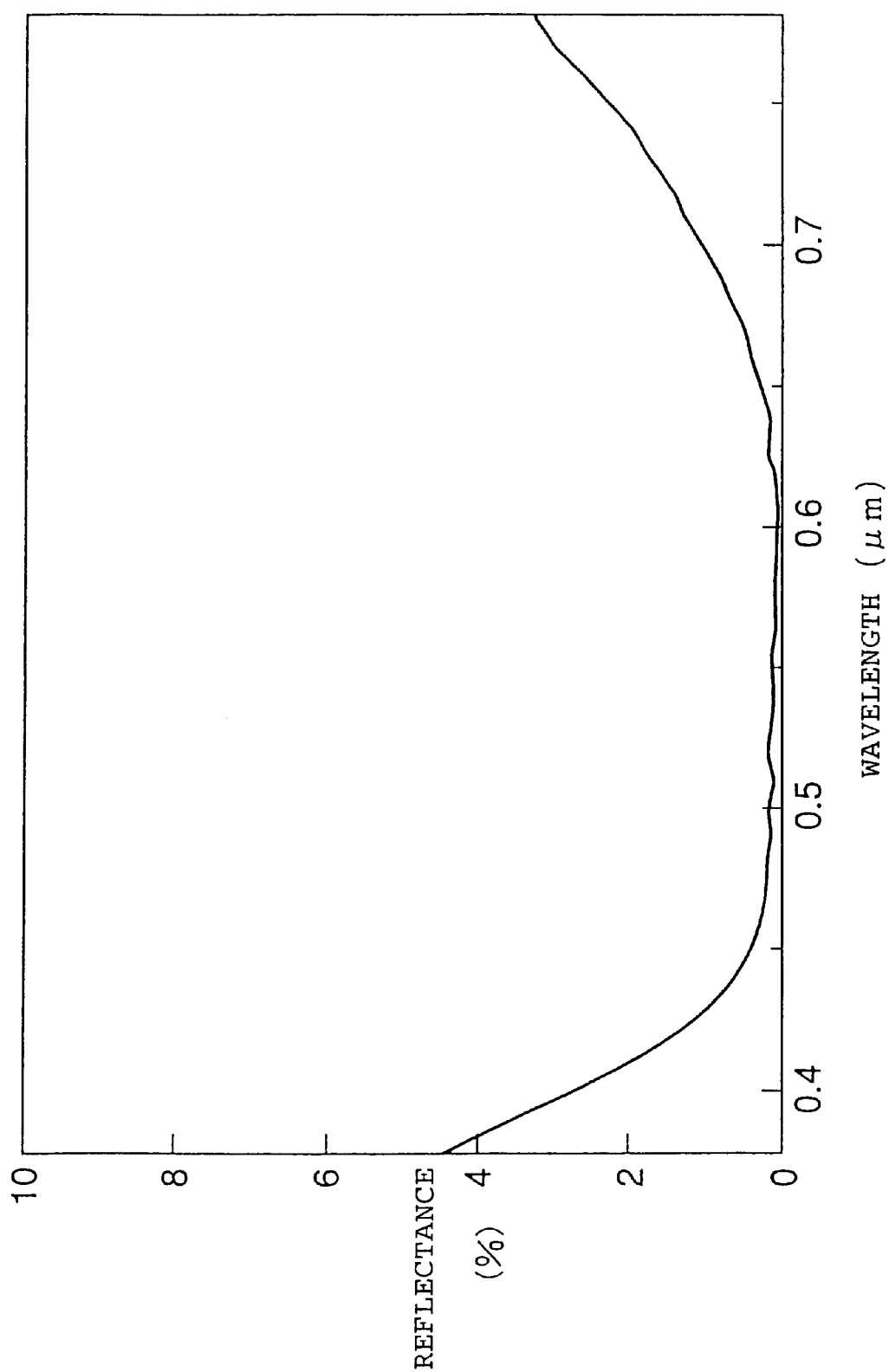

F I G. 17
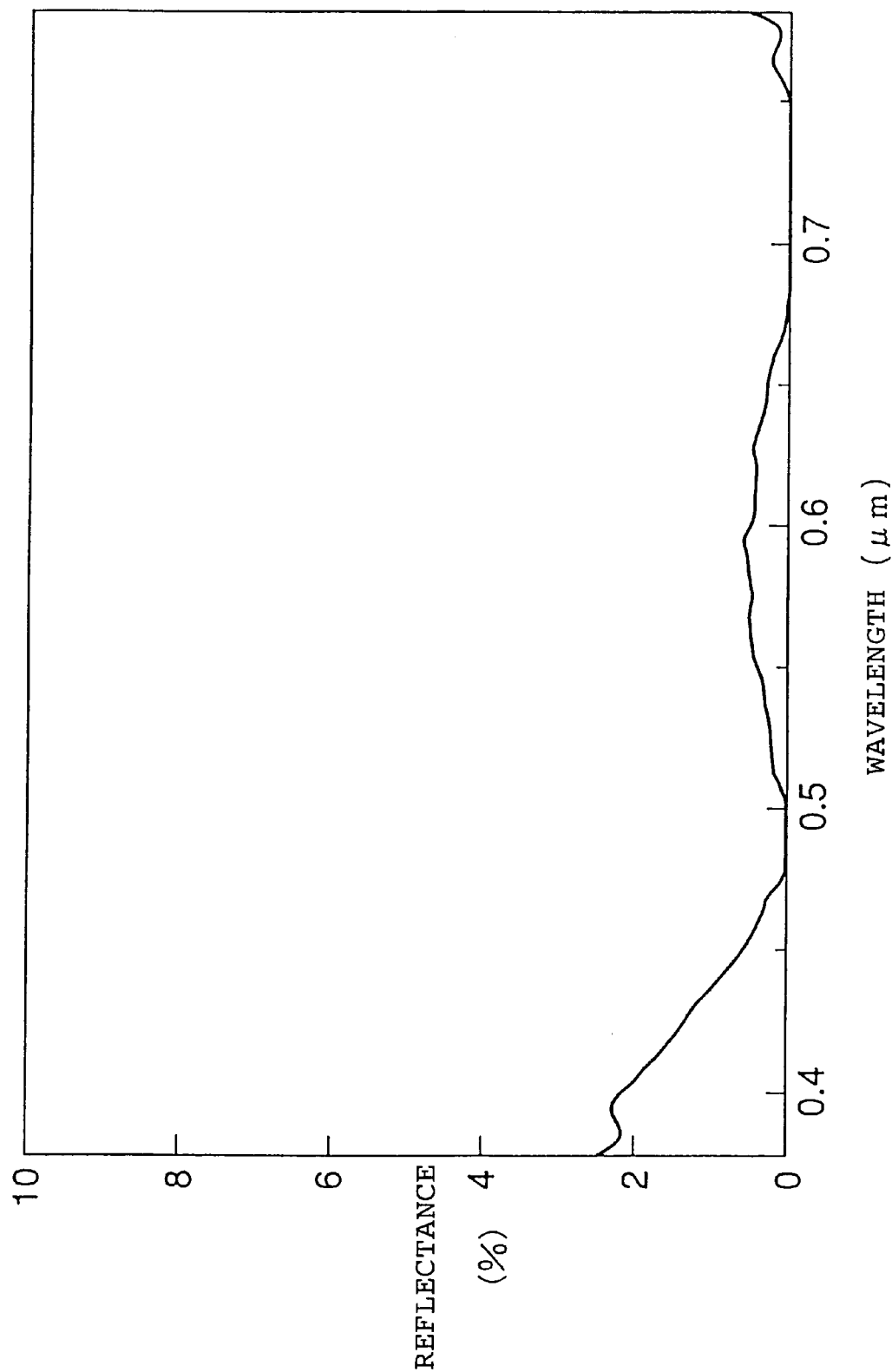

(A)

(B)

(C)

LIGHT ABSORPTION ANTIREFLECTIVE BODY AND METHOD OF PRODUCING THE SAME

TECHNICAL FIELD

The present invention relates to a light absorptive antireflector and a method for its production.

BACKGROUND ART

In recent years, with the rapid spread of computers, it has been demanded to reduce the reflection on a display surface and to provide an antistatic measure for the surface of a cathode ray tube (CRT) in order to improve the working environment for terminal operators. Recently, it has been further demanded to reduce the transmittance of a panel glass in order to improve the contrast and to shield electromagnetic waves of extremely low frequency.

In order to respond to such demands, methods have been adopted such that (1) an electrically conductive antireflection film is provided on a panel surface, (2) an electrically conductive antireflection film is provided on the front side of a face plate for a display screen of e.g. CRT, and such an antireflection film is bonded to the panel surface by means of a resin, and (3) a filter glass provided, on each side, with an electrically conductive antireflection film, is provided on the front side of CRT.

The following are known as conventional antireflection films. For example, "Optical Thin Films User's Handbook", J. D. Rancourt, McGRAW-HILL, pp128 (1987) discloses a spectral reflectance curve in a case where an absorptive film with a complex index of refraction (n−ik)=2−2i and a transparent film with n=1.65 are formed on a substrate with a refractive index of 2.35 in this order in thicknesses of 3 nm and 75.8 nm, respectively.

However, in this case, presented are theoretically calculated values, and the reflection characteristics are reflection characteristics shown by a transparent double layer film as the basic construction for antireflection and correspond to a so-called "V coat" which makes the reflection to be 0 only at a single wavelength, and they are not ones which show a low reflection performance within a wide range of a wavelength region (such as from 500 to 650 nm).

Further, U.S. Pat. No. 5,091,244 discloses to form a transition metal nitride film and a transparent film in film thicknesses of from 6 to 9 nm and from 2 to 15 nm, respectively, sequentially from the substrate side, as a construction to reduce the reflection of incident light from the substrate side (incident light from the side opposite to the film surface side).

It is as disclosed, for example, in "Thin-Film Optical Filters", H. A. Macleod, McGRAW-HILL, 2nd Ed., pp65–66 (1989) that when an absorptive film having a proper optical constant is formed to be thin, the reflectance from the substrate side decreases. In addition, in the proposal of the above-mentioned U.S. Pat. No. 5,091,244, $SiO_2$ is formed to be thin (from 2 to 15 nm).

However, the construction of U.S. Pat. No. 5,091,244 wherein $SiO_2$ is formed to be thin, is a construction by a film thickness designed for the purpose of reducing the reflection from the substrate side. In a case of a multilayer coating containing an absorptive film, reflection is totally different as between the front and rear sides, and accordingly, with this construction proposed to reduce the reflection from the substrate side, the reflectance from the film surface side will be about 10% over the visible light region, and a low reflection performance can not be obtained at all.

Further, the above-mentioned U.S. Pat. No. 5,091,244 illustrates a four layer construction of glass/transition metal nitride/transparent film/transition metal nitride/transparent film as a construction to reduce the reflection on the film surface side. However, the object is to control the visible light transmittance to a level of at most 50%, and this object is accomplished by dividing the absorptive layer into two layers to make the number of layers to be at least four layers, whereby there has been a practical problem from the viewpoint of the production cost.

JP-A-9-156964 discloses a construction having a transparent barrier film having a high refractive index provided between a light absorptive film and a low refractive index film in order to increase the resistance against oxidation of the light absorptive layer. However, with this construction, if the film thickness of the light absorptive film is made thick in order to lower the transmittance, the low reflection wavelength range tends to be narrow, and the bottom reflectance increases, whereby there has been a problem that the performance as an antireflection film is impaired.

Further, with the construction disclosed in the above-mentioned JP-A-9-156964 wherein a light absorptive film having a geometrical film thickness (hereinafter referred to simply as a film thickness) of from 15 to 30 nm, a transparent high refractive index film having a film thickness of from 10 to 40 nm and a silica film having a film thickness of from 50 to 90 nm are sequentially formed, the luminous reflectance shows a substantially low value, but reduction in the reflectance on a short wavelength side has been insufficient, and there has been a problem that the reflection color tends to be a strong blue, and the color can not be selected.

Further, with CRT in recent years, the transmittance of a glass base material for panel (hereinafter referred to simply as a panel base material) tends to be low year after year along with the requirement for high contrast, and a so-called "dark tint" panel has a transmittance of about 40%. When the transmittance of such a colored panel base material is combined with the antireflection film employing as a constituting element the absorptive film as disclosed in e.g. the above-mentioned JP-A-9-156964, the total transmittance will decrease. To reduce the total transmittance gives a preferred result for high contrast in many cases, but is not preferred since the initially planned transmittance (brightness) will change.

Namely, in designing the entire cathode ray tube, the final transmittance of the panel base material+the light absorptive antireflection film will be a question. The most preferred transmittance varies depending upon the type of the cathode ray tube, and it is difficult to realize the most preferred transmittance by limited types of panel base materials. Accordingly, it is desired to obtain a panel for cathode ray tube having a desired final transmittance by a combination of several kinds of panel base materials and by rather positively controlling the transmittance of the light absorptive antireflection film.

The above situation is not limited to a case where an antireflection film is applied directly to a panel glass for cathode ray tube but is likewise applicable to a case where, for example, a light absorptive antireflection film is applied to a plastic film, followed by bonding to a CRT panel glass later. Namely, in designing a final cathode ray tube, it is desired that the transmittance of the light absorptive antireflection film on the plastic film can optionally be selected.

It is an object of the present invention to solve the above-mentioned drawbacks of the prior art and to provide a light absorptive antireflector which has a sufficiently low reflection ability in a wide range of wavelength region, a sufficient low surface resistance to shield electromagnetic waves and a low luminous transmittance suitable for improving the contrast of a display and which has freeness in the transmittance and the reflection color and is excellent in the productivity, and a method for its production.

DISCLOSURE OF THE INVENTION

The present invention provide a light absorptive antireflector comprising a substrate, and a first layer of a light absorptive film, a second layer made of a material which has slight absorption within a wavelength of from 400 to 700 nm and which has an extinction coefficient being larger on a short wavelength side within a wavelength of from 400 to 700 nm and a third layer made of a material which is transparent within a wavelength of from 400 to 700 nm and which has a refractive index of less than 1.55, formed sequentially on the substrate, and a method for its production.

The slightly absorptive film to be used as the second layer in the present invention is effective to reduce the reflectance on the short wavelength side in a region with a wavelength of from 400 to 700 nm (hereinafter referred to also as a visible light region) (particularly effective in a case where the film thickness of the light absorptive film in the present invention is thick), and as compared with a case where a transparent film is used as the second layer, it is effective to sufficiently broaden the low reflection wavelength region and to realize a reflection spectrum which has the local maximum value in reflection at the center portion of the visible light region.

BRIEF DESCRIPTION OF THE DRAWINGS

FIG. 6 is a graph showing the spectral reflectance of the light absorptive antireflector of Example 3.

FIG. 12 is a graph showing the spectral reflectance of the light absorptive antireflector of Example 10.

FIG. 13 is a graph showing the spectral reflectance of the light absorptive antireflector of Example 12.

FIG. 14 is a graph showing the spectral reflectance of the light absorptive antireflector of Example 13.

FIG. 15 is a graph showing the spectral reflectance of the light absorptive antireflector of Example 14.

FIG. 17 is a graph showing the spectral reflectance of the light absorptive antireflector of Example 5 after heat treatment.

BEST MODE FOR CARRYING OUT THE INVENTION

Figure 1:
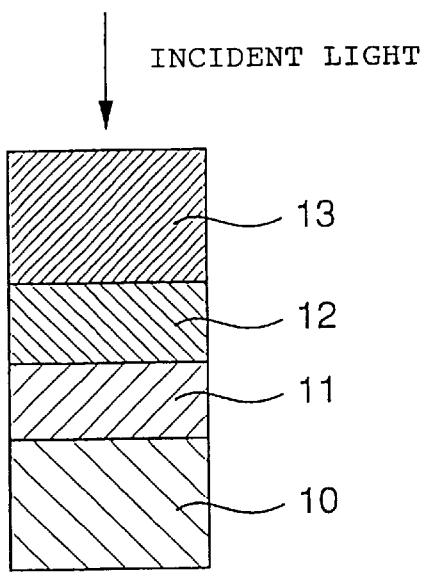
FIG. 1 is a schematic cross-sectional view of an embodiment of the present invention.

The second layer preferably has an extinction coefficient of from 0.05 to 0.6 at a wavelength of 400 nm, whereby good results can be obtained. Further, the second layer preferably has a refractive index of at least 1.8, whereby good results can be obtained. The upper limit for the refractive index is not particularly limited, but is preferably at most 3.0.

The second layer is preferably made of a material containing silicon nitride as the main component. For example, a silicon nitride film containing a small amount of oxygen, is preferred. In the case of a film made of a material containing silicon nitride as the main component, the extinction coefficient can easily be adjusted by changing the deposition conditions.

As another material, a material containing an oxide of bismuth as the main component, or a material containing an oxide of chromium as the main component, is, for example, preferred.

As the light absorptive film of the first layer, a material which substantially reduces the surface reflectance by the light interference effect with the second and third layers formed thereon, is employed.

As a preferred material for the first layer, a material containing gold and/or copper may, for example, be mentioned. More specifically, gold, a gold alloy, a nitride of a gold alloy, an oxynitride of a gold alloy, a carbonitride of a gold alloy, copper, a nitride of copper, an oxynitride of copper, copper alloy carbonitride of a copper alloy, a copper alloy, a nitride of a copper alloy, an oxynitride of a copper alloy or a carbonitride of a copper alloy may, for example, be mentioned.

In the present invention, particularly as the first layer, it is preferred to employ a film made of a material containing as the main component, a nitride of at least one metal selected from the group consisting of titanium, zirconium and hafnium. The film made of a material containing as the main component a nitride of the above metal is preferred from the dispersion relation of the extinction coefficient and the refractive index in a visible light region and has a characteristic such that by the value of the optical constant, the low reflection region in the visible light region will be broadened.

In a case where two or more materials are employed for the light absorptive film, 1) they may be used in the form of a composite material, or 2) films made of different materials may be used as piled up to have a total film thickness of from 5 to 40 nm.

Further, with a film containing titanium nitride as the main component, the value of the optical constant in the visible light region is proper and well matches with the slightly absorptive film of the second layer and a silica film suitable as the after-mentioned third layer to reduce the reflectance. Further, the value of the absorption coefficient is proper, and the film thickness to obtain a suitable light absorptivity will be within a range of from a few nm to a few tens nm, such being particularly preferred from the viewpoint of the productivity and reproducibility.

Also with a film containing zirconium nitride as the main component, the value of the optical constant in the visible light region is proper. Further, when a film containing zirconium nitride as the main component is employed, the obtainable transmission color of the light absorptive antireflector tends to be bluish than the case wherein a film containing titanium nitride as the main component, is employed. Accordingly, in a case where a bluish transmission color is desired, it is preferred to employ a film containing zirconium nitride as the main component. The transmission color depends also on the deposition conditions, but partly derives from the film material itself, and the film containing zirconium nitride as the main component makes it easy to obtain a bluish transmission color than the film containing titanium nitride as the main component.

On the other hand, an effect has been found such that by the presence of oxygen in the light absorptive film, the bonding strength with the substrate as an oxide or with a silica film of the upper layer (the third layer) will be improved. Accordingly, in some cases, it is preferred that oxygen is contained in the light absorptive film so long as the optical constant of the light absorptive film can be maintained within a preferred range.

In the case of a film containing titanium nitride as the main component (hereinafter referred to as a TiN light absorptive film), the atomic ratio of oxygen to titanium (hereinafter referred to simply as the oxygen/titanium ratio) in the film is preferably at most 0.5 from the viewpoint of the optical constant and the resistivity. If this ratio exceeds 0.5, it tends to be a titanium oxynitride film, whereby the resistivity will increase, and the optical constant will be improper and the surface resistance value and the antireflection effect will be degraded. The lower limit of the oxygen/titanium ratio is not particularly limited, but is preferably at least 0.01.

When a TiN light absorptive film is to be formed by usual sputtering method, inclusion of oxygen in the film due to e.g. the remaining gas content in the vacuum chamber, can not be avoided. Heretofore, little has been known about the influence of the oxygen in the film over the optical characteristics of a TiN light absorptive film, and nothing has been known with respect to the influence over the performance as a light absorptive layer in the present invention.

The present inventors have conducted extensive researches on the relation between the deposition conditions for a TiN light absorptive film and the amount of oxygen in the TiN light absorptive film and the relation thereof with the performance as a light absorptive layer in the present invention, and as a result, have found that as a TiN light absorptive film in the present invention, the oxygen/titanium ratio is preferably within a range of from 0.11 to 0.33 from the viewpoint of the optical constant. If the oxygen/titanium ratio exceeds 0.33, the wavelength dependency of the optical constant of the TiN light absorptive film will depart from the preferred range, and the low reflection characteristic tends to be bad. Further, the film tends to be an oxynitride film, whereby the resistivity will increase, and the surface resistance value will exceeds 1 k$\Omega$/□, whereby the electromagnetic wave-shielding tends to be insufficient. On the other and, if the oxygen/titanium ratio is less than 0.11, it ends to be metal rich, and again, the wavelength dependency of the optical constant of the TiN light absorptive film will depart from the preferred range, and the low reflection characteristic tends to be bad.

As the third layer, it is preferred to employ a film made of a material containing silicon and oxygen. It is particularly preferred to employ a silica film (preferably a silica film having a refractive index of from 1.46 to 1.52, particularly preferably a refractive index of from 1.46 to 1.47).

In the present invention, the respective layers can be formed by various conventional film-forming methods, such as a sputtering method, a vacuum vapor deposition method, a CVD method and a sol-gel method.

A DC sputtering method is preferred from a viewpoint such that control of the film thickness is relatively easy, a practical film strength can be obtained even if formed on a low temperature substrate, a large surface area can easily be obtainable, and formation of a multi-layer film is easy by using a so-called in-line type machine. Further, it is also an advantageous point of the DC sputtering method that the deposition conditions can be adjusted relatively easily so that the light absorptive film will have a preferred optical constant.

Further, in a case where an in-line type sputtering apparatus is employed, the film thickness distribution in the width direction of transportation can be adjusted to some extent by installing a masking plate or by means of a magnetic field intensity distribution of a cathode magnet. Therefore, when a substrate to be used for the front surface of a display, is employed as the substrate, the film thickness at the peripheral portion of the substrate can be set to be slightly thick as compared with the center portion. By providing such a film thickness distribution on the substrate, it is possible to suppress a phenomenon such that when the peripheral portion of a screen is viewed from the center, the reflection color tends to shift to yellow or red by an oblique incident effect of light, such being practically preferred.

The vacuum vapor deposition method has drawbacks such that heating of the substrate is required, treatment over a large area is difficult and it is relatively difficult to obtain a good nitride. However, for a relatively small substrate material which is durable at a high temperature, it is advantageous as it is most completed as a process.

The CVD method requires a further higher temperature, and treatment over a large area is difficult from the viewpoint of the film thickness distribution, but it is an excellent method to obtain a good nitride.

The sol-gel method has been practically used as a surface treating technique for a cathode ray tube. It is relatively difficult to obtain a good nitride, and it will be batch treatment for each tube. However, the investments to installation may be small, therefore this method may be advantageous from the viewpoint of costs for the production in a small amount.

In the present invention, the first and second layers may be formed by sputtering whereby relatively preferred optical constants can be obtained easily, and then, the third layer may be formed by wet system spin coating which is excellent in the film-forming cost. In this case, depending upon the spin coating liquid, the second layer may be eroded, whereby there may be a case where the desired characteristics can not be obtained. For example, when a spin coating liquid comprising 0.1 N hydrochloric acid, tetraethoxysilane and ethyl alcohol, is employed, it is preferred to form an oxide film or a nitride film having good durability as a protective film for the second layer prior to the spin coating. Further, the first layer may be formed by a CVD method, the second layer may be formed by a vacuum deposition method, and then, the third layer may be formed by wet system spin coating advantageous in the film-forming cost.

In the foregoing, several methods have been described as methods for forming the light absorptive antireflection film of the present invention. However, the present invention is not limited to these methods.

From the viewpoint of productivity, it is preferred to form the first, second and third layers by sputtering. It is particularly preferred to form the first and second layers in the same gas atmosphere.

In the present invention, when a TiN light absorptive film is used as the first layer, a silicon nitride film deficient in nitriding (hereinafter referred to as a slightly absorptive silicon nitride film) is used as the second layer, and a silica film is used as the third layer, the first and second layers can be formed in the same chamber (referred to as chamber A) by a so-called in-line type sputtering apparatus excellent in mass productivity. Accordingly, a chamber for gas separation may be provided only between chamber A and a chamber for forming a silica film (the third layer) to be formed as an upper layer subsequently, such being extremely efficient.

If the first layer is made of a nitride film such as a TiN light absorptive film, and the second layer is made to be a slightly absorptive silicon nitride film, the first and second layers can be formed in the same chamber, such being extremely advantageous from the viewpoint of productivity.

Further, due to the slightly absorptive silicon nitride film of the second layer, an effect can be obtained such that the bonding strength between the TiN light absorptive film and the silica film of the outermost layer is improved.

As the TiN light absorptive film, it is most preferred from the viewpoint of the productivity to employ one obtained by DC sputtering of a metal titanium target in the presence of a nitrogen gas.

The sputtering gas contains nitrogen and rare gas as the main components in order to bring the optical constant of the TiN light absorptive film to a preferred range, and the proportion of the nitrogen is preferably from 3 to 50 vol %, particularly preferably from 5 to 20 vol %. If the proportion of the nitrogen is smaller than this, the film tends to be a titanium excessive TiN light absorptive film, whereby the low reflection wavelength region will be narrow. On the other hand, if the proportion of the nitrogen is larger than this, the film tends to be a nitrogen excessive TiN light absorptive film, whereby the low reflection wavelength region will be narrow, and the resistivity of the TiN light absorptive film will be high, and the surface resistance will be large.

The electric power density to be applied to the target is preferably at least 1 W/cm$^2$. This is intended to keep the film-forming rate at a level sufficiently high for industrial production and to keep the amount of impurities taken into the TiN light absorptive film during the deposition, to be low. This is particularly effective for suppressing the amount of oxygen taken into the film.

Further, it is preferred that the electric power sensity to be applied to the target at that time is made to be at most 10 W/cm$^2$. This is intended to obtain a TiN light absorptive film having a proper optical constant and to avoid frequent abnormal electric discharge or melting of the target or the cathode by an excess power application to the target. Namely, if a power exceeding 10 W/cm$^2$ is applied, the film tends to be a Ti rich TiN light absorptive film even by using a pure nitrogen atmosphere, and the desired composition tends to be hardly obtainable, and the target and the surrounding parts tend to be heated, whereby there may be generation of arcing and, in some cases, a danger of melting the heated portions.

It will be no problem that a small amount of impurities are contained in the composition of the target or the sputtering gas, so long as the finally formed thin film substantially has an optical constant of a TiN light absorptive film. Further, a TiN light absorptive film may be formed by sputtering by using, as the target, a material containing titanium nitride as the main component.

As the silica film as the third layer, it is preferred from the viewpoint of the productivity to employ one obtained by DC sputtering of a conductive silicon target in the presence of an oxygen gas. At that time, a small amount of impurities (P, Al and B) may be included in order to let the target have electrical conductivity. In the present invention, the silica film includes a film which has substantially the same refractive index as silica even if it contains a small amount of impurities.

In DC sputtering of silicon, it may happen that arcing is induced by charging up on an insulating silica film deposited along the peripheral portion of the erosion (eroded) region of the target, whereby discharge tends to be unstable, or particles of silicon or silica discharged from arc spots will deposit on the substrate to form defects. To avoid such a phenomenon, a method of neutralizing the charging up is employed in many cases by periodically applying a positive voltage to the cathode, and it is particularly preferred to employ a silica film formed by such a method, also from the viewpoint of the stability of the process. As a method for forming a silica film, RF sputtering may also be employed.

With respect to the film thicknesses of the respective layers in the present invention, it is preferred from the viewpoint of antireflection that the film thickness of the first layer is from 5 to 40 nm, the film thickness of the second layer is from 2 to 40 nm, and the film thickness of the third layer is from 40 to 110 nm.

The film thickness of the first layer is preferably from 15 to 30 nm, particularly preferably from 18 to 30 nm, from the viewpoint of reducing transmission (low transmittance) and from the viewpoint of reducing reflection (low reflectance). The film thickness of the second layer is preferably from 10 to 40 nm, particularly preferably from 10 to 35 nm, from the viewpoint of the low transmittance and low reflectance. The film thickness of the third layer is preferably from 40 to 90 nm, particularly preferably from 40 to 80 nm, further preferably from 50 to 80 nm, from the viewpoint of the low transmittance and low reflectance.

The film thickness in the case where a silica film is employed as the third layer, is preferably from 50 to 90 nm, since the low reflection wavelength region can be adjusted to the center portion of the visible light region. Particularly preferred is more than 55 nm and not more than 85 nm. Depending also on the combination of the light absorptive film and the slightly absorptive film, if the film thickness of silica is not more than 55 nm, the reflectance on the long wavelength side tends to be large, and if it exceeds 85 nm, rising of the reflectance on the short wavelength side tends to shift towards the long wavelength side.

In the present invention, the total film thickness from the first to the third layers is preferably at least 100 nm from the viewpoint of the low transmittance and low reflectance.

In the present invention, it is preferred to form a metal film or a metal nitride film between the second and third layers. Such a layer is not one which influences the optical performance, but functions as a layer (hereinafter referred to as a barrier layer) to prevent oxidation of the first layer and the second layer during deposition of the third layer and during heat treatment (such as heat treatment in the process of producing a cathode ray tube) which is carried out when needed after all films have been formed.

The barrier layer may, for example, be a film containing, as the main component, at least one metal selected from the group consisting of chromium, molybdenum, tungsten, vanadium, niobium, tantalum, zinc, nickel, palladium, platinum, aluminum, indium, tin and silicon or a film containing, as the main component, a nitride of the above metal, or a film containing, as the main component, at least one metal selected from the group consisting of titanium, zirconium and hafnium.

The film containing silicon as the main component or the film containing transparent silicon nitride as the main component, is excellent in the barrier performance, and when a silica film is formed as the third layer by employing a conductive Si target, such is advantageous from the viewpoint of the production, as it is not required to increase the target material.

In a case where a transparent barrier layer is employed, when a material having a refractive index of from about 1.5 to 2.0 (e.g. a layer containing as the main component aluminum nitride or transparent silicon nitride) is used, the allowable film thickness will be the largest, and a film thickness of up to 10 nm will be allowed.

The barrier layer is widely practiced in so-called Low-E glass employing a silver film. For example, U.S. Pat. No. 4,548,691 and JP-A-59-165001 disclose to form a barrier layer for the purpose of preventing oxidation of a silver film when an oxide film is to be formed on the silver film. As in this case, the barrier layer is a thin film to be formed to prevent oxidation of another layer formed therebeneath, and optically, it has no significance.

The film thickness of the barrier layer is preferably at most 10 nm in order not to impair the inherent antireflective performance. Further, if the thickness of the barrier layer is less than 1 nm, improvement in the heat resistance tends to be insufficient. Accordingly, the heat resistance can effectively be improved if a barrier layer having a film thickness of from 1 to 10 nm is inserted. Particularly preferred is from 1 to 8 nm.

When the barrier layer is a light absorptive metal film or the like, the thickness of the barrier layer is preferably at most 5 nm.

The light absorptive antireflector of the present invention preferably has a light absorptivity in the visible light region of from 20 to 65%. If the light absorption is outside this range, no adequate antireflection performance in the visible light region tends to be obtainable.

Further, the luminous transmittance (the luminous transmittance in accordance with JIS R3106) of the light absorptive antireflector of the present invention is preferably from 30 to 65%, particularly preferably from 30 to 55%, whereby a high contrast and low reflectance can be obtained.

Further, the reflectance of the incident light from the third layer side is preferably at most 0.6% at a wavelength of from 500 to 650 nm. Further, the reflectance is more preferably at most 1.0%, particularly preferably at most 0.6%, at a wavelength of from 450 to 500 nm.

Further, the sheet resistance of the light absorptive antireflector of the present invention is preferably from 150 to 400 $\Omega/\square$.

As the substrate to be used in the present invention, a glass substrate or a substrate made of an organic material can be used. Particularly preferred is a glass substrate or a plastic substrate, which constitutes the front surface of a display screen.

The glass substrate to be used for the front surface of a display, may, for example, be a panel glass itself constituting a cathode ray tube, a face plate glass to be used as bonded to a cathode ray tube by means of a resin, or a filter glass installed between a cathode ray tube and an operator. Further, a front glass for a flat panel display such as a liquid crystal display panel or a plasma display panel, may, for example, be mentioned.

Further, the plastic substrate to be used for the front surface of a display may, for example, be 1) a transparent plastic film of e.g. PET (polyethylene terephthalate) to be used as bonded to the front glass of a cathode ray tube or the above flat display by means of a resin, 2) a transparent plastic as a filter substrate installed between a cathode ray tube and an operator, or 3) a transparent plastic plate forming the front surface of a flat display.

Figure 19:
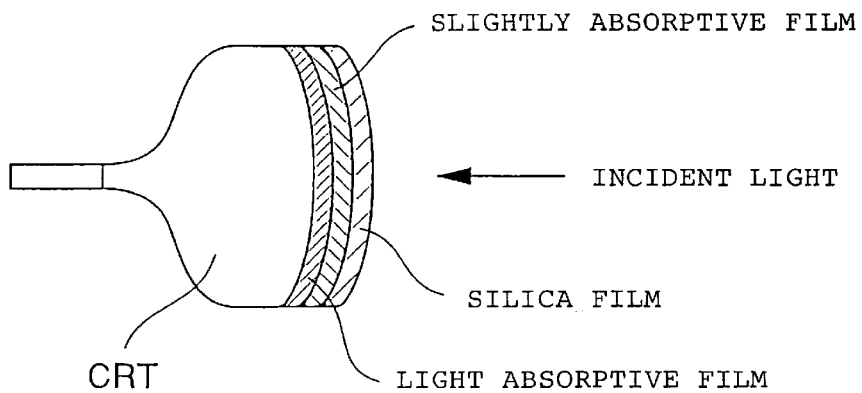
FIG. 19 shows examples wherein a light absorptive antireflector of the present invention is utilized.
Figure 19:
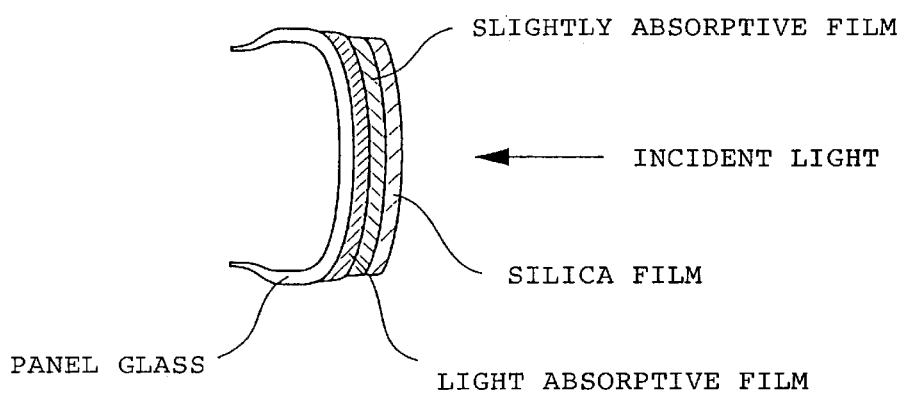
Figure 19:
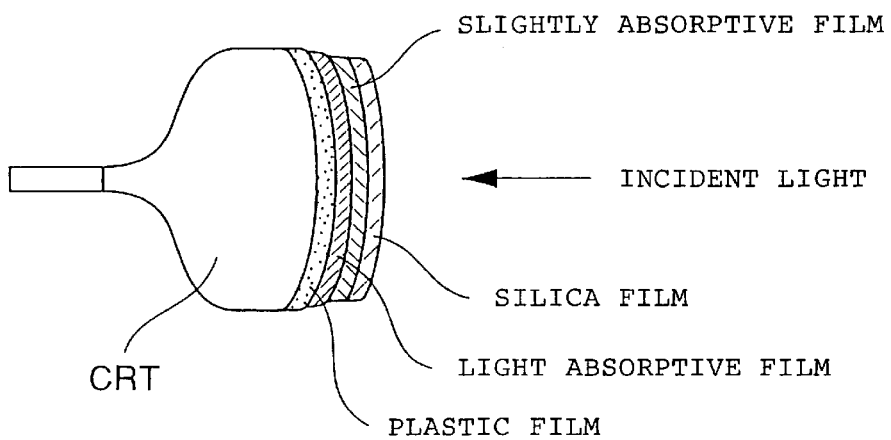

Examples in which the light absorptive antireflector of the present invention is utilized, are shown in FIG. 19. (A) to (C) in FIG. 19 show examples in which the light absorptive antireflector of the present invention is applied to CRT, a panel glass and a plastic film to be bonded to the front surface of CRT, respectively.

The light absorptive antireflector of the present invention in which a light absorptive antireflection film is formed on the substrate surface on the observer's side as shown in FIG. 19, exhibits excellent antireflection characteristics. Further, the light absorptive antireflection film is formed directly on the surface of the substrate which generates electromagnetic waves, whereby the electromagnetic waves can very effectively be shielded. Further, when the light absorptive antireflector of the present invention is applied to a filter glass, it is advisable to form an antireflection film also on the substrate surface opposite to the observer.

When the light absorptive antireflector of the present invention is applied to a panel glass, in the subsequent step, heat treatment is carried out such that it is heated and fused to other constituting part materials (such as a funnel) to obtain a cathode ray tube. Such heat treatment may be simulated by repeating heating at a temperature of about 450° C. for 30 minutes, twice.

With the light absorptive antireflector of the present invention, the change in the luminous transmittance as between before and after such heat treatment is preferably at most 8%.

When a substrate made of an organic material is employed as the substrate, it is preferred to have a layer containing silicon nitride as the main component between the substrate and the first layer. Further, the substrate made of an organic material preferably has a anti-abrasion layer. As a material for the anti-abrasion layer, an acrylate may, for example, be mentioned.

Further, the substrate made of an organic material is preferably subjected to plasma treatment in vacuum before forming the first layer. When it has a anti-abrasion layer, it is preferred that plasma treatment is carried out with respect to the substrate provided with the anti-abrasion layer. The plasma treatment is preferably radio frequency (RF) plasma treatment.

The plasma treatment is carried out, for example, by placing a substrate made of an organic material in a vacuum chamber and then applying a radio frequency electric power to electrode arranged at the rear surface of the substrate, and it is carried out so that the treating time t(sec) satisfies $2P \cdot t/(V \cdot e \cdot \pi) > 5 \times 10^{15}$ (e is an elementary electric charge and $1.6 \times 10^{-19}$ (C)) where P is an electric power (W/cm$^2$) applied to the substrate surface and V is the self-bias potential (V) of the electrode.

In the present invention, it is preferred to employ a gas containing no oxygen gas, as the gas to be introduced into the chamber after placing the substrate made of an organic material in the vacuum chamber. Further, it is more preferred not to use a gas containing an oxygen atom-containing gas (such as oxygen, carbon monoxide, carbon dioxide, nitrogen monoxide or nitrogen dioxide).

In the present invention, an additional thin film layer may be provided to improve the bonding strength at the interfaces or to adjust the color, as the case requires.

In order to facilitate wiping off a finger print left on the outermost surface, an oil repellent organic film containing a fluorocarbon may be formed on the outermost layer. The forming method may, for example, be a vapor deposition method or a coating and drying method, and either method is to form an extremely thin film to such an extent not to present any optical influence. By application of such treatment, the antireflection film surface will be hardly stained, and if stained, such a stain can readily be wiped off, such being desirable.

In a case where the light absorptive antireflector of the present invention is applied to the front glass of a display to absorb a part of incident light and to reduce the transmittance, the intensity of light rays entering from the surface (the observer's side) and being reflected at the surface on the display element side, will be reduced, whereby the contrast can be increased by increasing the ratio of the display light to this background light.

The light absorptive antireflector of the present invention exhibits excellent antireflection characteristics, and particularly, the film structure can be adjusted so that it will have a small local maximum at the center portion of the visible light region. If the film structure is adjusted in a direction to increase the local maximum value, the reflection color tends to be a green type. Further, inversely, if the film structure is adjusted in a direction to reduce the local maximum value, the reflection color tends to be a purple type. If the film thickness of silica becomes thick, the blue tint will increase, and inversely, if the film thickness of silica becomes thin, a red tint will increase. Further, if the film thickness of the light absorptive film becomes thick, the color tends to be deep, and inversely, if the film thickness of the light absorptive film becomes thin, the color tends to be colorless.

Accordingly, the film thickness may be adjusted suitably depending upon the particular purpose.

EXAMPLES

Example 1

In a vacuum chamber, metal titanium and N-type silicon (phosphorus-doped single crystal) having a resistivity of 1.2 Ω·cm were placed as targets on the cathodes, and the vacuum chamber was evacuated to $1 \times 10^{-5}$ Torr. A three layer film was formed as follows on a soda lime glass substrate 10 placed in the vacuum chamber, to obtain a light absorptive antireflector as shown in FIG. 1.

As the sputtering gas, a mixed gas of argon and nitrogen (nitrogen: 20 vol %) was introduced, and the conductance was adjusted so that the pressure became about $2 \times 10^{-3}$ Torr. Then, to the cathode of titanium, a negative DC voltage (applied power density: about 4.0 W/cm$^2$) was applied, and by the DC sputtering of the titanium target, a titanium nitride film 11 having a film thickness of 26 nm was formed as a light absorptive film of the first layer (step 1).

Figure 2:
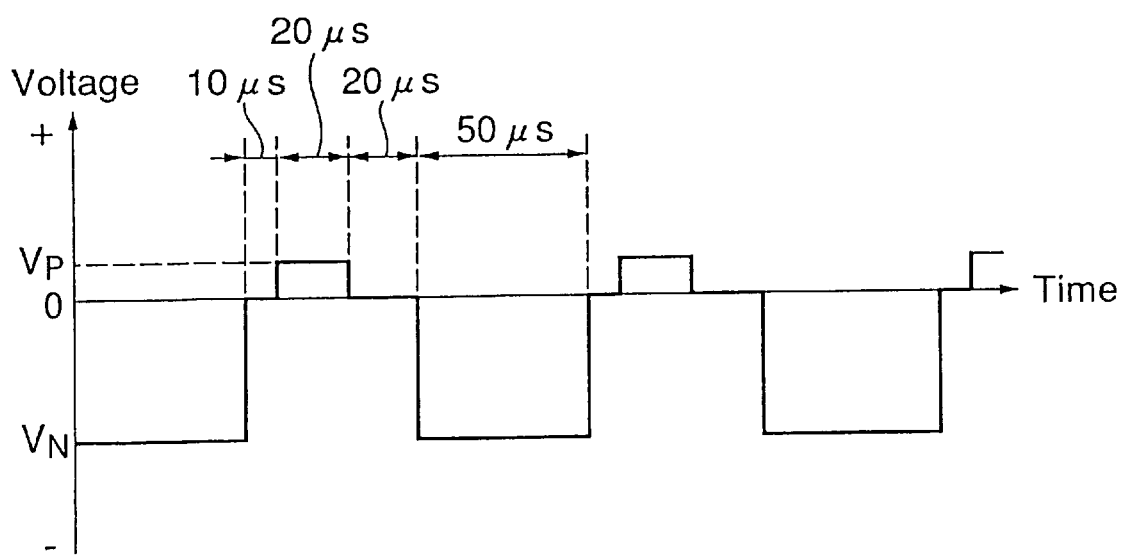
FIG. 2 is a graph showing the change with time of the voltage applied to a silicon target employed in Examples and Comparative Examples.

Then, in the same gas atmosphere, a voltage of a waveform shown in FIG. 2 (in FIG. 2, $V_N$ is a negative voltage applied to the target, and $V_P$ is a positive voltage applied to the target) was applied to the cathode of silicon, and a silicon nitride film 12 having a film thickness of 26 nm was formed as a slightly absorptive film of the second layer, by intermittent DC sputtering (applied power density: about 1.0 W/cm$^2$) of the silicon target (step 2). Hereinafter, the slightly absorptive silicon nitride film will be referred to as a slightly absorptive $SiN_x$ film.

Then, introduction of the gas was stopped, and the vacuum chamber was highly evacuated, and then as a sputtering gas, a mixed gas of argon and oxygen (oxygen: 50 vol %) was introduced, and the conductance was adjusted so that the pressure became about $3 \times 10^{-3}$ Torr. Then, to the cathode of silicon, a voltage having a waveform shown in FIG. 2, was applied, and a silica film 13 (refractive index: about 1.47) having a film thickness of 70 nm was formed as a low refractive index film of the third layer by intermittent DC sputtering (applied power density: about 1.0 W/cm$^2$) of the silicon target (step 3).

Figure 3:
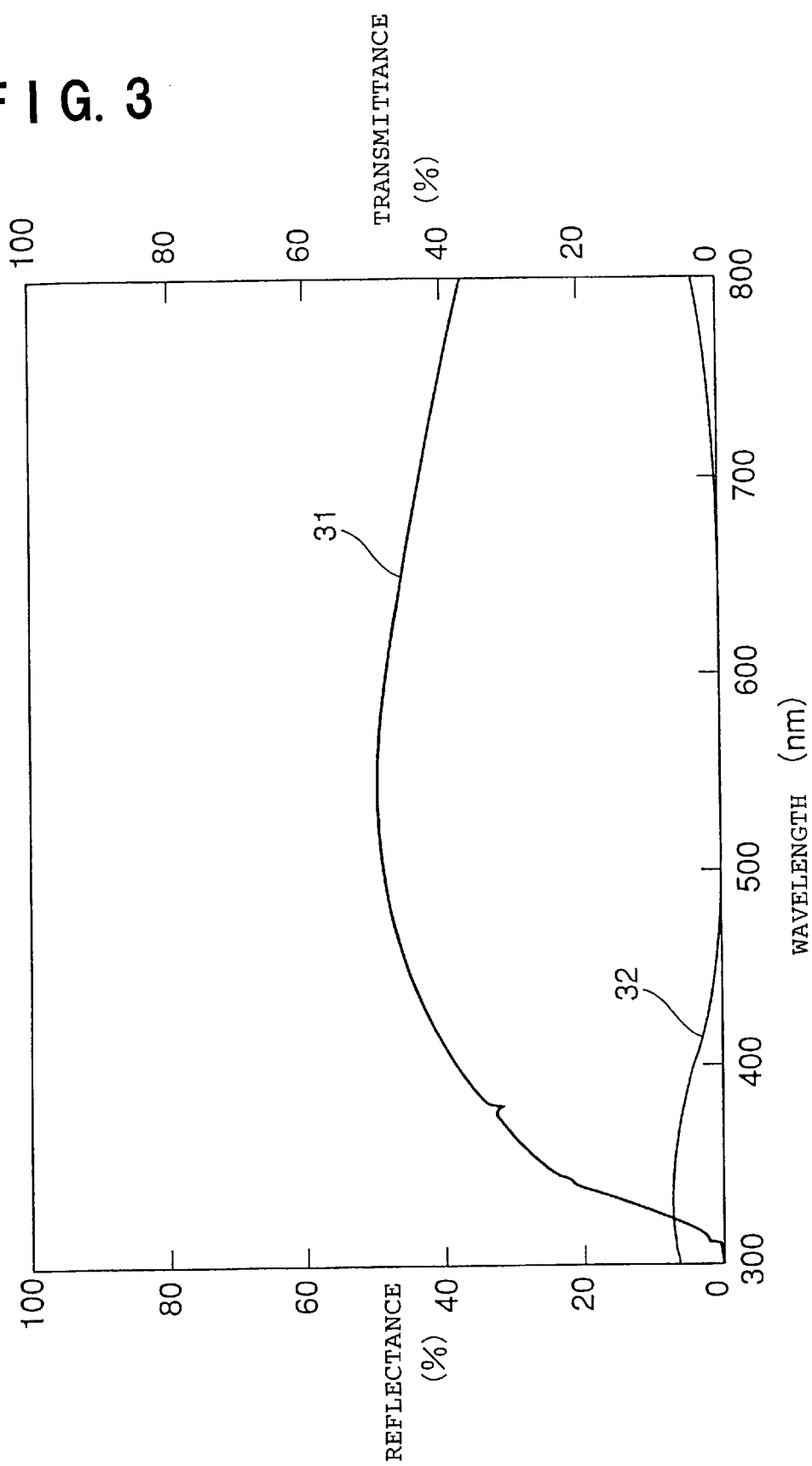
FIG. 3 is a graph showing the spectral reflectance and the spectral transmittance of the light absorptive antireflector of Example 1.
Figure 4:
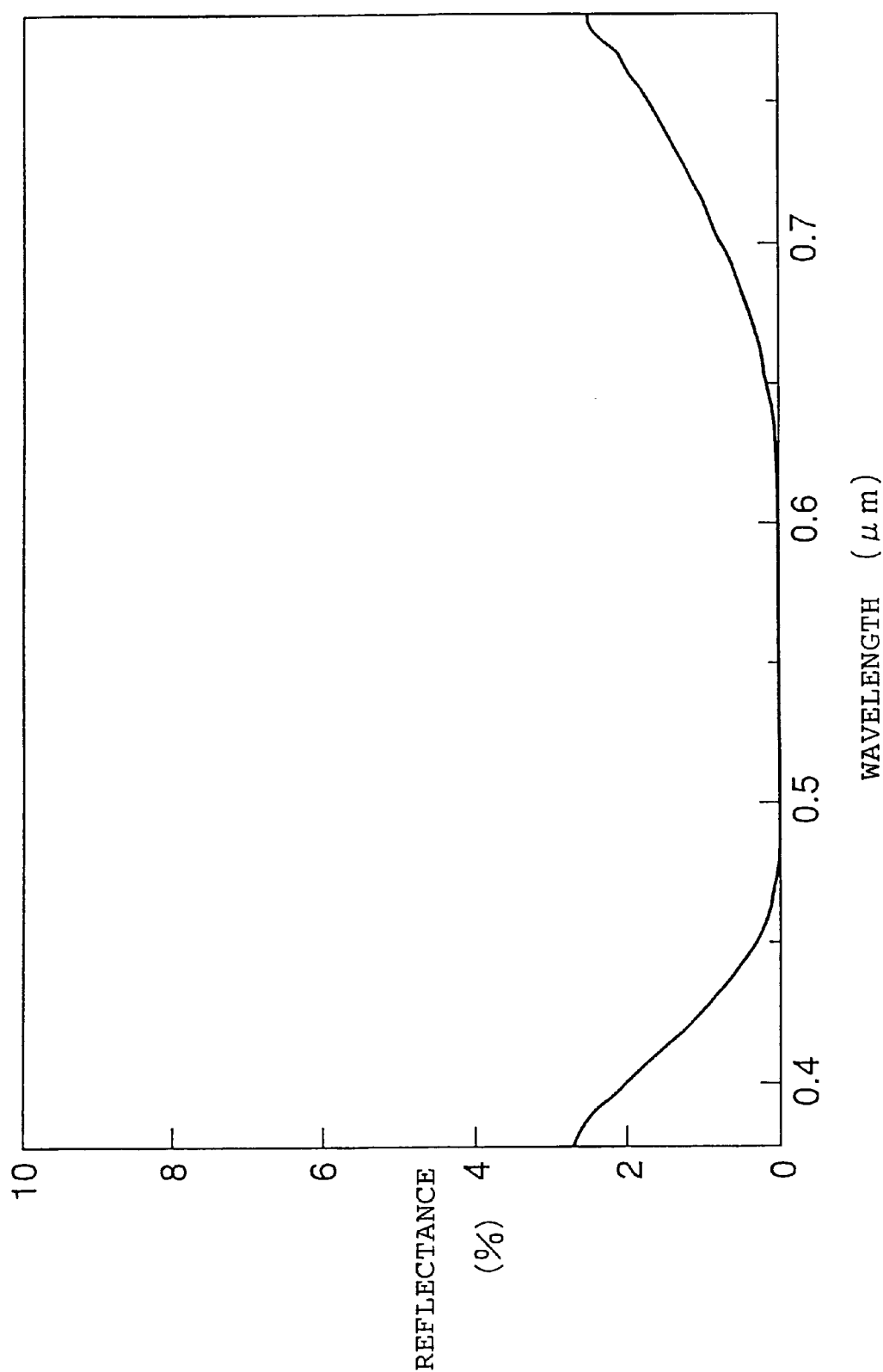
FIG. 4 is a graph showing the spectral reflectance of the light absorptive antireflector of Example 1.

The spectral transmittance of the obtained light absorptive antireflection glass was measured. Further, the spectral reflectance of this sample was measured from the film surface side in such a state that the rear surface reflectance was extinguished by coating a black lacquer on the rear surface of the glass substrate. Curve 31 of the obtained spectral transmittance and curve 32 of the spectral reflectance are shown in FIG. 3. Further, only the spectral reflectance curve was enlarged 10 and shown in FIG. 4. The sheet resistance measured by a non-contact resistance meter was about 230 Ω/□.

Further, after step 1, the titanium nitride film-attached glass substrate was taken out, and the titanium nitride film was analyzed by ESCA, whereby the atomic ratio was Ti:O=1:0.16.

Further, only the film formation of step 2 was carried out to form a slightly absorptive $SiN_x$ film on a glass substrate. The optical constant of the slightly absorptive $SiN_x$ film was measured by spectroscopic ellipsometry, whereby the refractive index at 550 nm was 2.21, and the extinction coefficient at 400 nm, 550 nm and 700 nm was 0.19, 0.06 and 0.03, respectively. Further, the slightly absorptive $SiN_x$ film was analyzed by ESCA, whereby the atomic ratio was Si:N:O= 1:0.93:0.20.

Example 2

Figure 5:
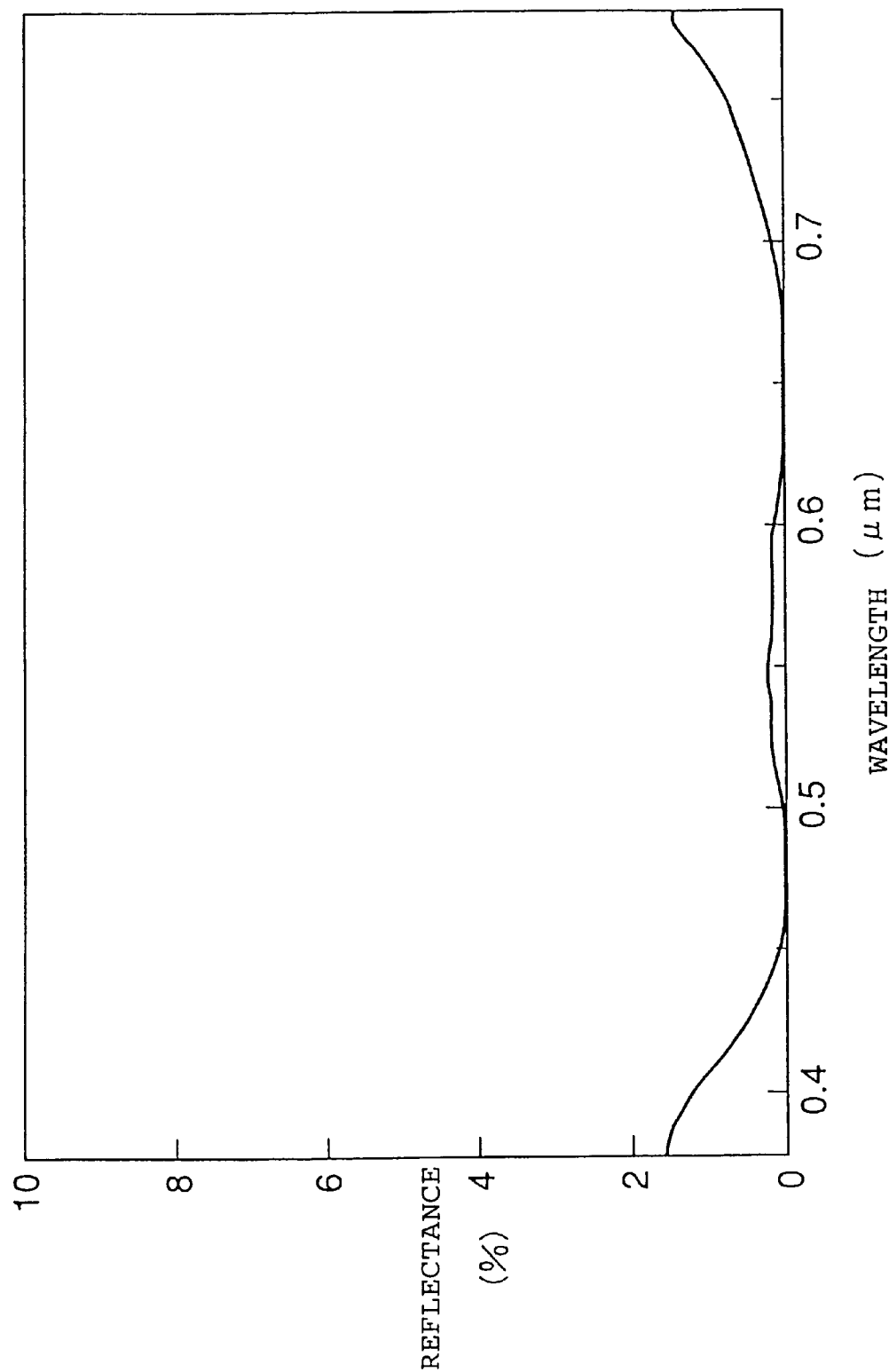
FIG. 5 is a graph showing the spectral reflectance of the light absorptive antireflector of Example 2.

A light absorptive antireflection glass was formed in the same manner as in Example 1 except that the film thickness in step 2 of Example 1 was changed to 30 nm. With respect to the obtained light absorptive antireflection glass, the spectral reflectance was measured in the same manner as in Example 1, and the results are shown in FIG. 5. After formation of the titanium nitride film, the substrate was taken out in the same manner as in Example 1, and the titanium nitride film was analyzed by ESCA, whereby the atomic ratio was Ti:O=1:0.20.

Example 3

A light absorptive antireflection glass was formed in the same manner as in Example 1 except that the film thickness in step 2 of Example 1 was changed to 34 nm. With respect to the obtained light absorptive antireflection glass, the spectral reflectance was measured in the same manner as in Example 1, and the results are shown in FIG. 6. After forming the titanium nitride, the substrate was taken out in the same manner as in Example 1, and the titanium nitride film was analyzed by ESCA, whereby the atomic ratio was Ti:O=1:0.18.

Example 4

After forming a titanium nitride film of 15 nm in the same manner as in step 1 of Example 1, a slightly absorptive $SiN_x$ film of 22 nm was formed in the same manner as in step 2 except that the applied power density to the target was changed to 0.80 kW/cm$^2$. Then, in the same manner as in step 3, a silica film of 78 nm was formed to obtain a light absorptive antireflection glass.

Figure 7:
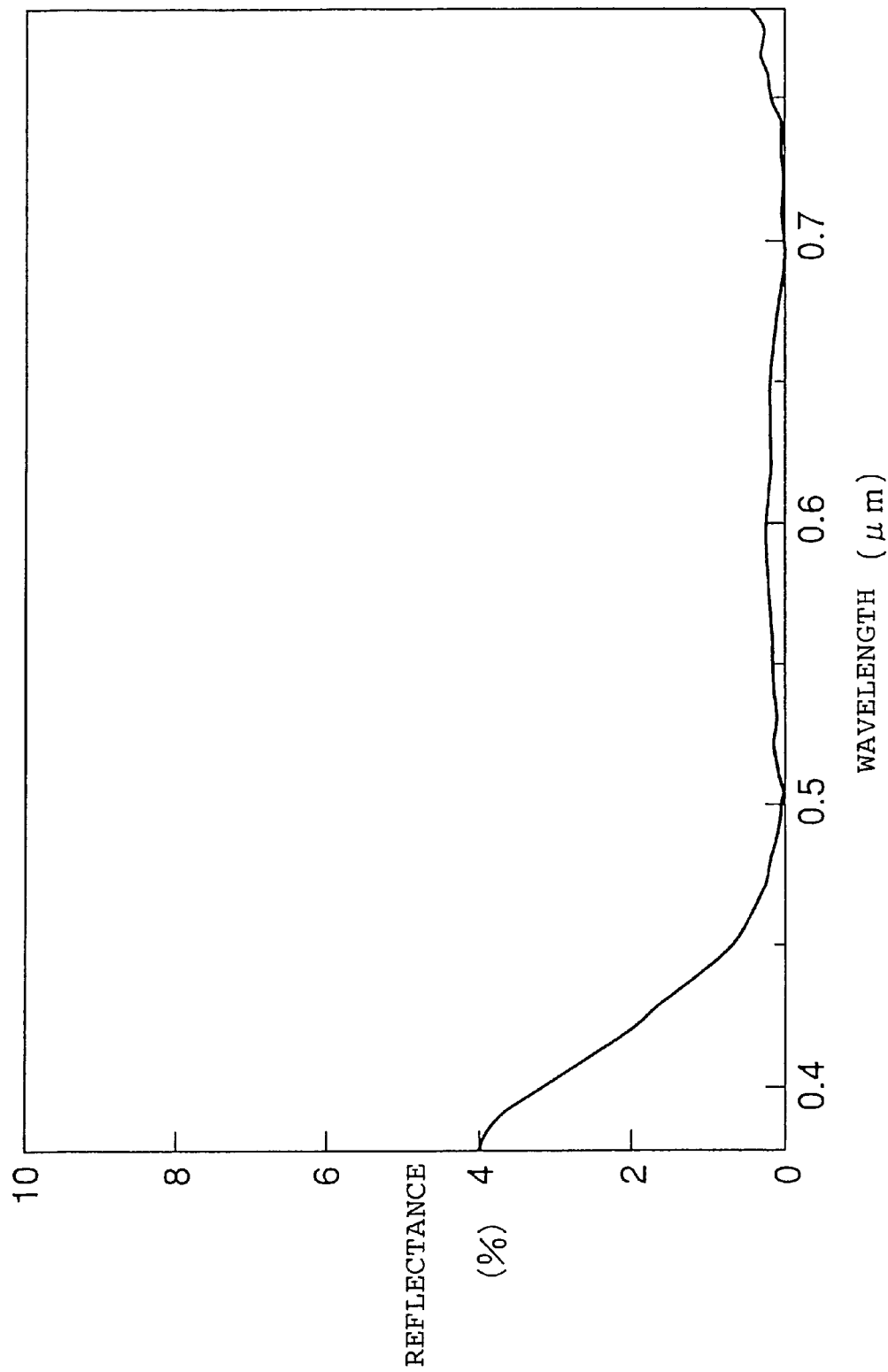
FIG. 7 is a graph showing the spectral reflectance of the light absorptive antireflector of Example 4.

With respect to the obtained light absorptive antireflection glass, the sheet resistance was measured by a non-contact resistance meter and found to be about 250 Ω/□. With respect to the obtained light absorptive antireflection glass, the spectral reflectance was measured in the same manner as in Example 1, and the results are shown in FIG. 7.

Further, only a slightly absorptive $SiN_x$ film of the second layer was separately formed, and the optical constant of the slightly absorptive $SiN_x$ film was measured by spectroscopic ellipsometry, whereby the refractive index at 550 nm was 2.15, and the extinction coefficient at 400 nm, 550 nm and 700 nm, was 0.13, 0.05 and 0.03, respectively. Further, the slightly absorptive $SiN_x$ film was analyzed by ESCA, whereby the atomic ratio was Si:N:O=1:0.93:0.25.

Example 5

Figure 8:
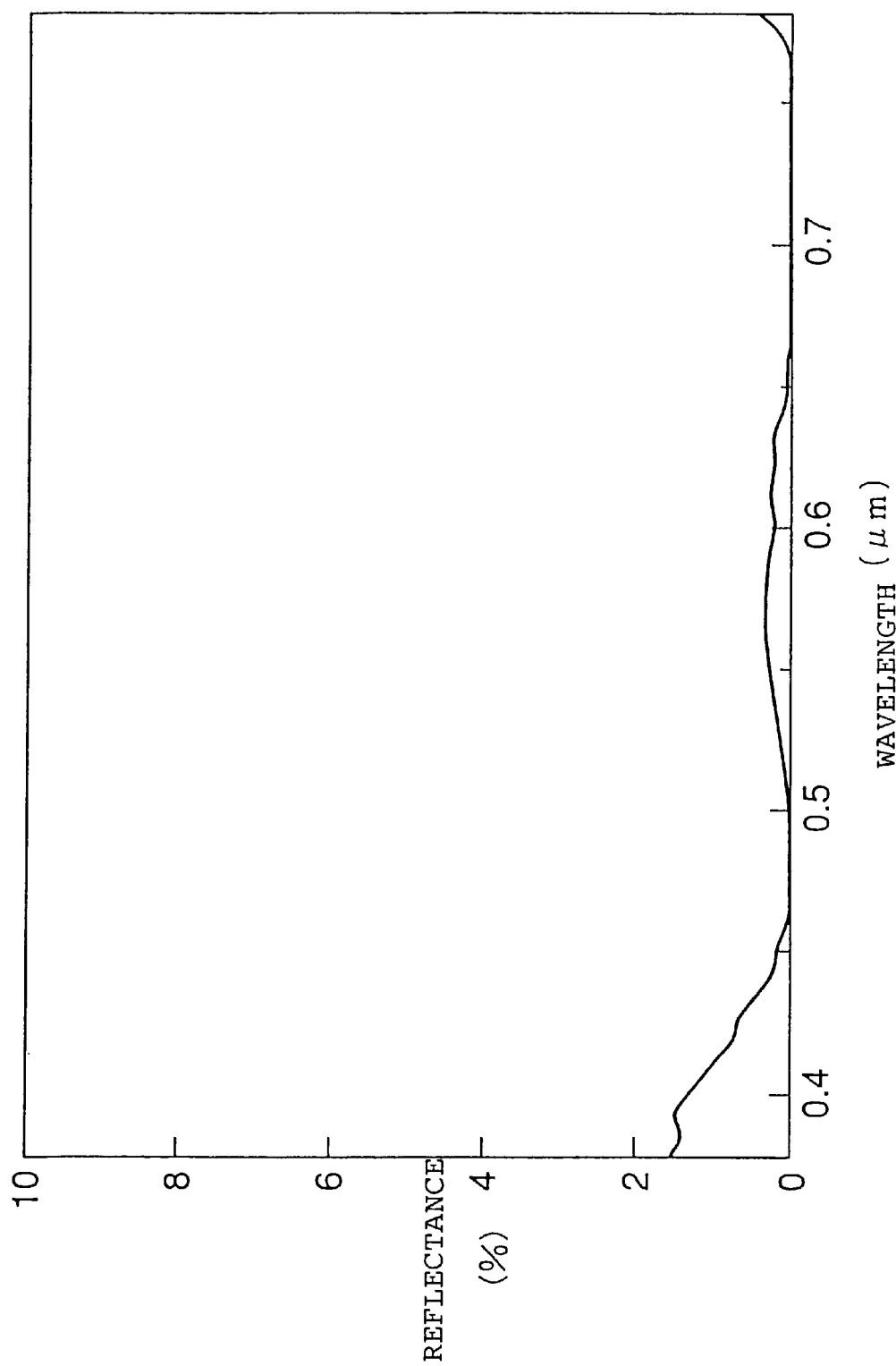
FIG. 8 is a graph showing the spectral reflectance of the light absorptive antireflector of Example 5.

In the same manner as in steps 1 and 2 of Example 2, a titanium nitride film of 26 nm and a slightly absorptive $SiN_x$ film of 30 nm were formed. Then, as the sputtering gas, a mixed gas of argon and nitrogen (nitrogen: 50 vol %) was used, and an electric power of a waveform shown in FIG. 2 (applied power density: about 1.0 W/cm$^2$) was applied to the silicon target, whereby a transparent silicon nitride film (hereinafter referred to as a transparent $SiN_x$ film) was formed in a film thickness of about 5 nm (barrier layer). Then, in the same manner as in step 3 of Example 1, a silica film having a film thickness of 70 nm was sequentially formed. With respect to the obtained light absorptive antireflection glass, the spectral reflectance was measured in the same manner as in Example 1, and the results are shown in FIG. 8.

Example 6

Figure 9:
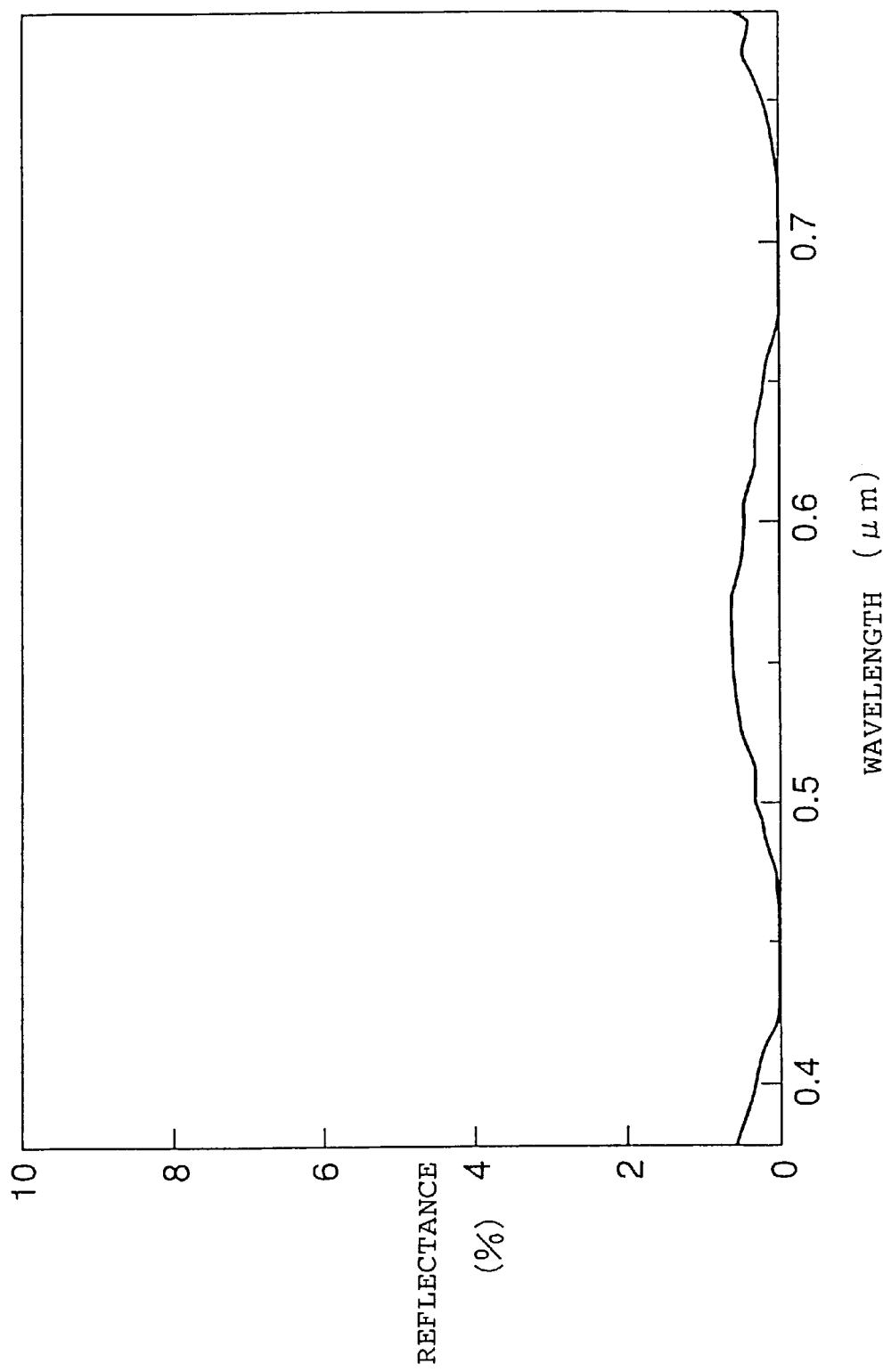
FIG. 9 is a graph showing the spectral reflectance of the light absorptive antireflector of Example 6.

A light absorptive antireflection glass was formed in the same manner as in Example 5 except that the film thickness of silica in Example 5 was changed to 63 nm. The spectral reflectance of the obtained light absorptive antireflection glass was measured in the same manner as in Example 5, and the results are shown in FIG. 9.

Example 7

Using the same apparatus and targets as in Example 1, the vacuum chamber was evacuated to 1×10$^{-5}$ Torr. In the vacuum chamber, one obtained by cutting out a PET film (acrylate anti-abrasion coated, 150 µm thickness) in a square of about 10 cm×10 cm and attaching it to a glass substrate by a heat resistant tape, was preliminarily set, and a light absorptive antireflection film of the present invention was formed as follows.

(1) Firstly, as the sputtering gas, argon was introduced, and the conductance was adjusted so that the pressure became 1×10$^{-3}$ Torr. Then, an RF power 200W was applied to the substrate holder (surface area: about 1200 cm$^2$) for 1 minute to carry out RF plasma treatment. Here, the self bias voltage of the electrode was −280V, and 2P·t/(V·e·π)=1.4× 10$^{17}$.

(2) Then, the gas was switched to a mixed gas of argon and nitrogen (50 vol % nitrogen), and the pressure was adjusted to 2×10$^{-3}$ Torr. And a voltage having a waveform shown in FIG. 2 was applied to the silicon target, whereby a transparent $SiN_x$ film having a film thickness of 2 nm was formed by intermittent DC sputtering (applied power density: about 1.0 W/cm$^2$) of the silicon target.

(3) Then, in the same manner as in steps 1 to 3 of Example 1, a titanium nitride film having a film thickness of 26 nm, a slightly absorptive $SiN_x$ film having a film thickness of 26 nm and a silica film having a film thickness of 70 nm, were formed sequentially.

Figure 10:
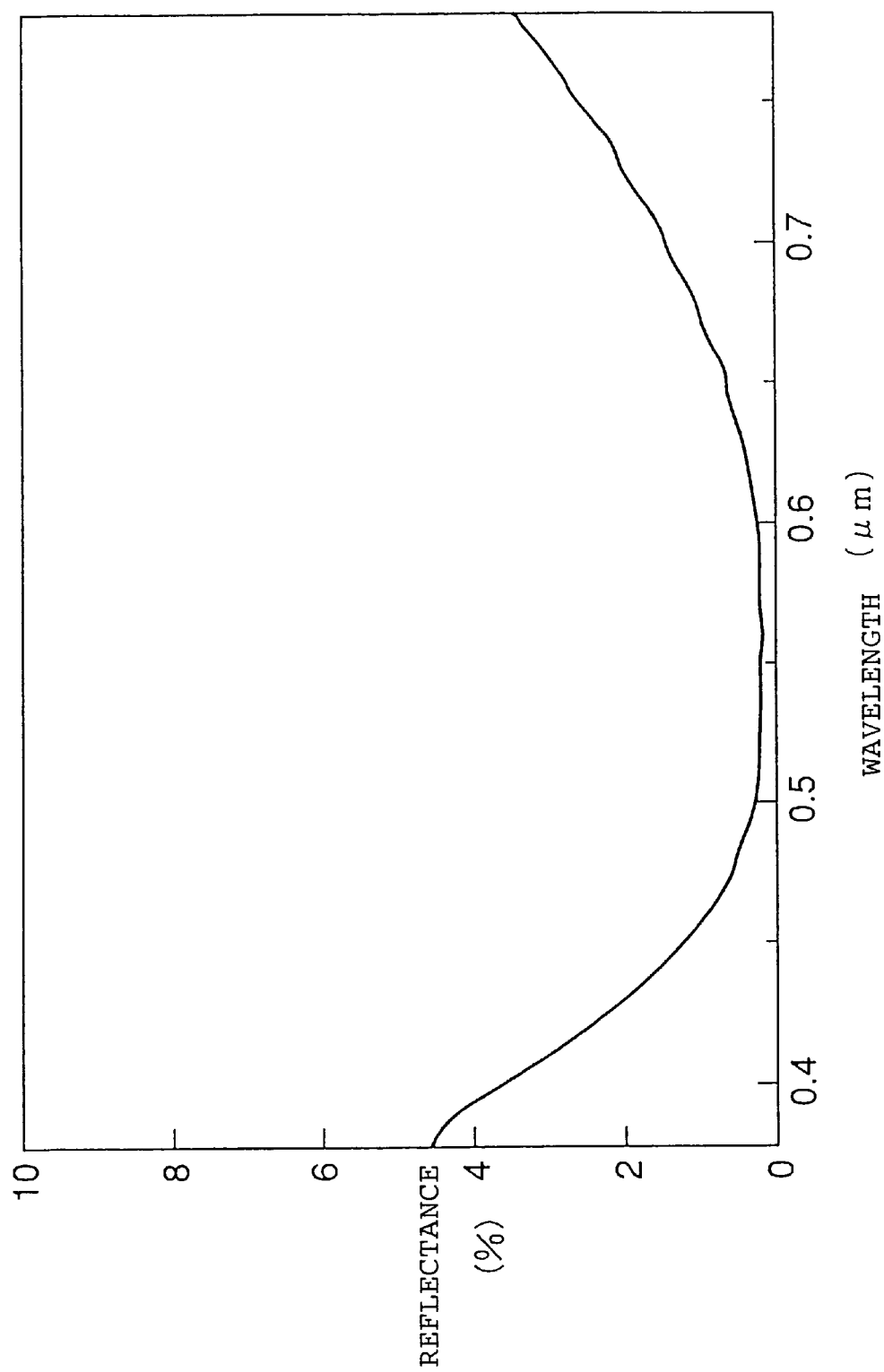
FIG. 10 is a graph showing the spectral reflectance of the light absorptive antireflector of Example 7.

In the same manner as in Example 1, the spectral reflectance of the obtained light absorptive antireflection film was measured. The measurement of the spectral reflectance was carried out in such a state where the rear surface reflectance was extinguished by coating a black lacquer on the rear side to measure the surface reflectance only. With respect to the obtained light absorptive antireflection film, the spectral reflectance was measured in the same manner as in Example 1, and the results are shown in FIG. 10.

Further, as a durability test, the obtained light absorptive antireflection film was put into a constant temperature and constant humidity chamber (50° C., 95% RH) for 48 hours and then rubbed for 10 reciprocations by applying a load of about 2 kg/cm$^2$ to a gauze containing ethanol, whereby peeling of the film was visually inspected, and no peeling was observed.

Example 8

Figure 11:
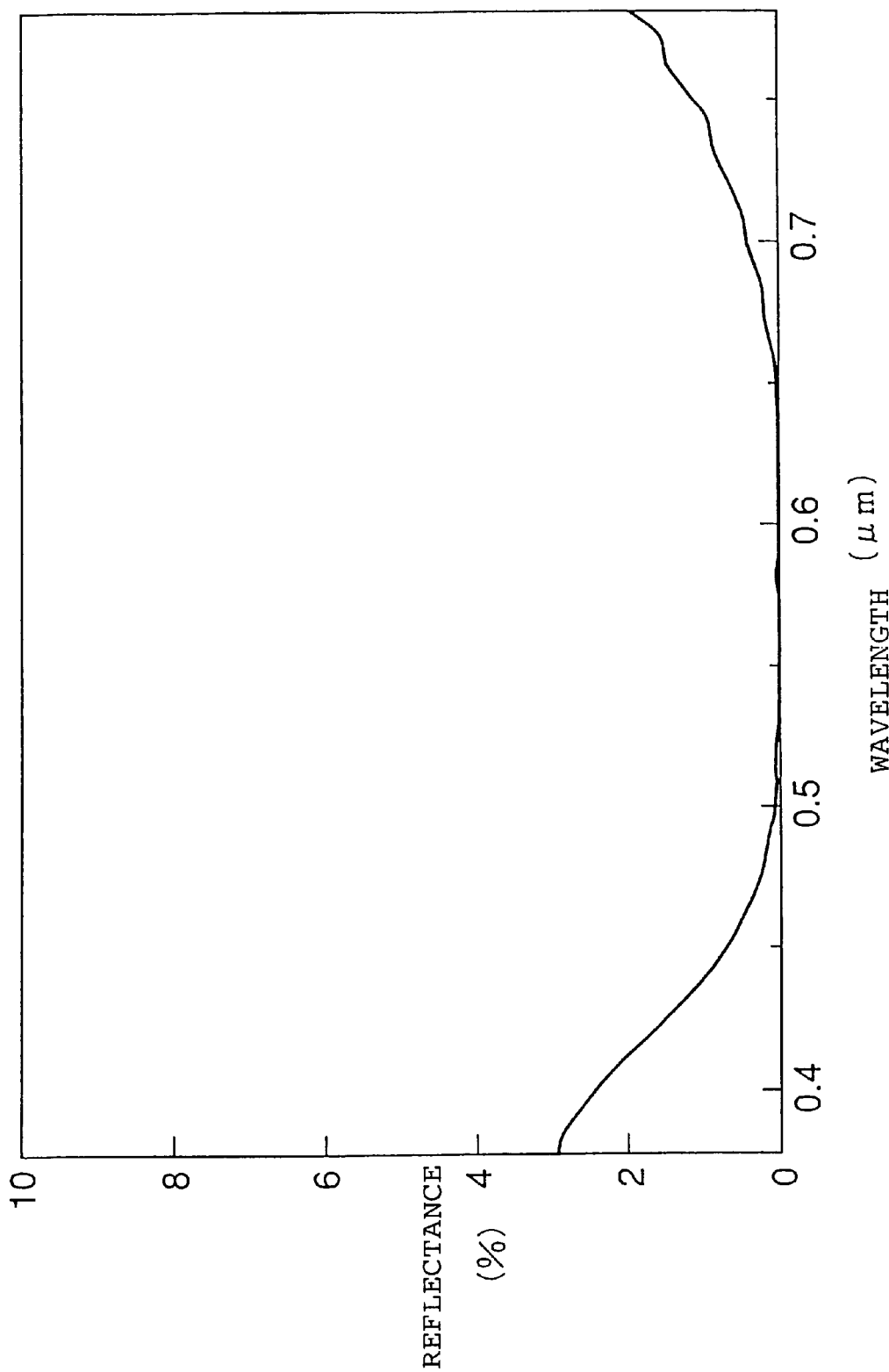
FIG. 11 is a graph showing the spectral reflectance of the light absorptive antireflector of Example 8.

A light absorptive antireflection film was formed in the same manner as in Example 7 except that the film structure in (3) in Example 7 was changed to the film structure of Example 2. The spectral reflectance of the obtained light absorptive antireflection film was measured in the same manner as in Example 7, and the results are shown in FIG. 11. Further, the obtained light absorptive antireflection film was subjected to the durability test in the same manner as in Example 7, and no peeling was observed.

Example 9

In the same manner as in the operation shown in (1) and (2) of Example 7, a transparent $SiN_x$ film having a film thickness of 2 nm was formed on an acrylate anti-abrasion coated PET film. Then, in the same manner as in steps 1 and 2 of Example 3, a titanium nitride film having a film thickness of 26 nm and a slightly absorptive $SiN_x$ film having a film thickness of 30 nm were formed sequentially. Then, in the same manner as in Example 5, the sputtering gas was switched to a mixed gas of argon and nitrogen (nitrogen: 50 vol %), and a power having a waveform shown in FIG. 2 (applied power density: about 1 W/cm$^2$) was applied to the silicon target, whereby a transparent $SiN_x$ film was formed in a film thickness of 5 nm. Then, in the same manner as in step 3 of Example 1, a silica film having a film thickness of 70 nm was formed. The obtained light absorptive antireflection film was subjected to the same durability test as in Example 7, whereby no peeling was observed.

Example 10

A light absorptive antireflection film was formed in the same manner as in Example 7 except that the film structure in (3) in Example 7 was changed to the film structure of Example 4. The spectral reflectance of the obtained light absorptive antireflection film was measured in the same manner as in Example 7, and the results are shown in FIG. 12. Further, the obtained light absorptive antireflection film was subjected to the same durability test as in Example 7, whereby no peeling was observed.

Example 11

In a vacuum chamber, metal zirconium and a N-type silicon (phosphorus-doped single crystal) having a resistivity of 1.2 Ω·cm were set as targets on the cathodes, and the vacuum chamber was evacuated to $1 \times 10^{-5}$ Torr. A three layer film was formed as follows on a soda lime glass substrate 10 placed in the vacuum chamber, to obtain a light absorptive antireflector as shown in FIG. 1.

As the sputtering gas, a mixed gas of argon and nitrogen (nitrogen: 15 vol %) was introduced, and the conductance was adjusted so that the pressure became about $2 \times 10^{-3}$ Torr. Then, to the cathode of zirconium, a negative DC voltage (applied power density: about 1.5 W/cm$^2$) was applied, and a zirconium nitride film 11 having a film thickness of 19 nm was formed as a light absorptive film of the first layer by DC sputtering of the zirconium target.

Then, a slightly absorptive $SiN_x$ film 12 having a film thickness of 33 nm was formed as a slightly absorptive film of the second layer, in the same manner as in step 2 of Example 1 except that the nitrogen fraction of the sputtering gas was changed to 30%, and the film thickness was changed.

Then, a silica film 13 having a film thickness of 68 nm was formed as a low refractive index film of the third layer in the same manner as in step 3 of Example 1 except that an oxygen gas (oxygen: 100 vol %) was introduced as the sputtering gas, and the film thickness was changed.

Figure 20:
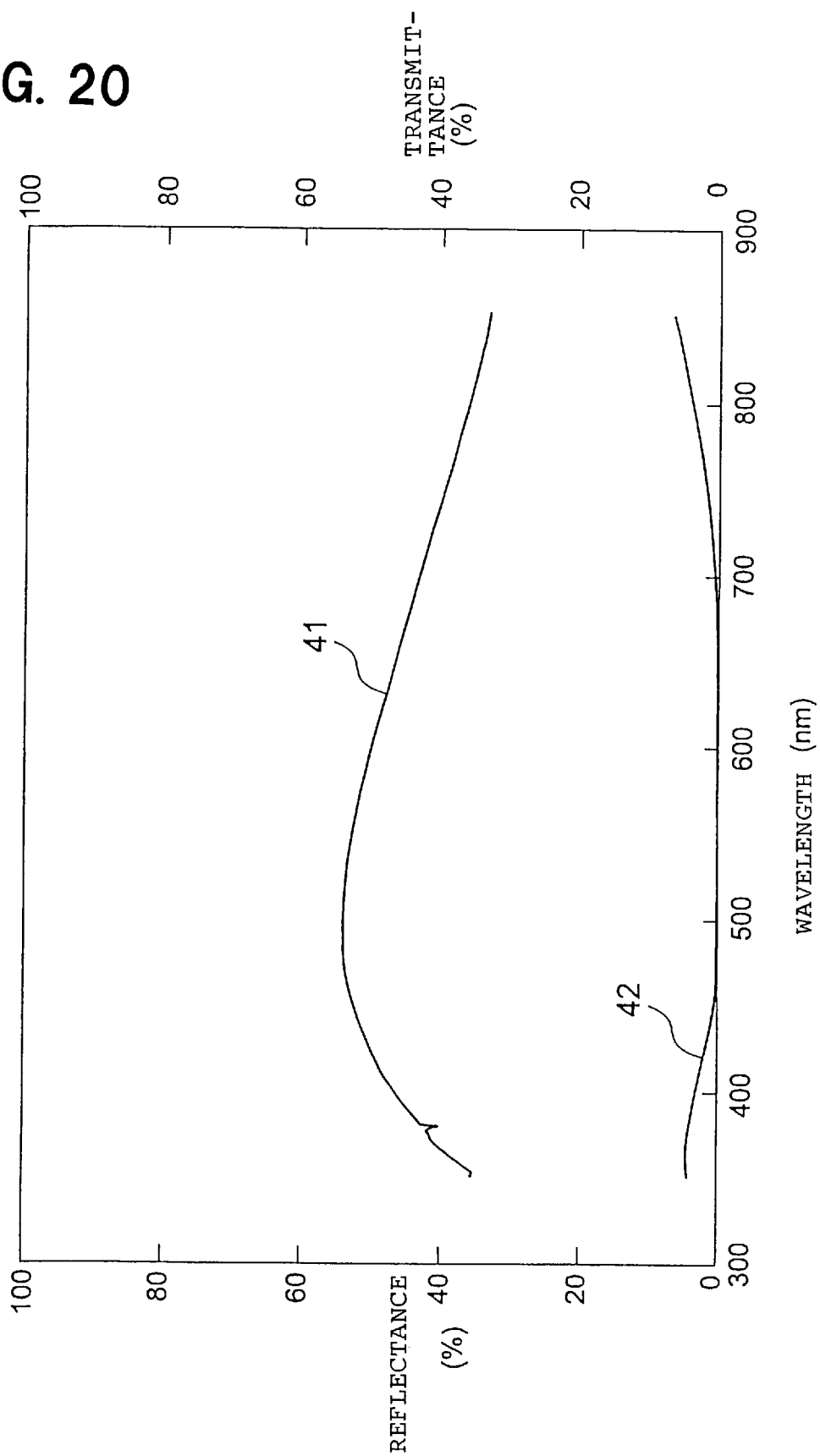
FIG. 20 is a graph showing the spectral reflectance of the light absorptive antireflector of Example 11.

The spectral transmittance and the spectral reflectance of the obtained light absorptive antireflection glass were measured in the same manner as in Example 1. Curve 41 of the obtained spectral transmittance and curve 42 of the spectral reflectance are shown in FIG. 20. When the spectral transmittance curve is compared with one in FIG. 3, the peak of the transmittance is shifted toward the low wavelength side, whereby it is evident that the transmission color is bluish. Further, as shown in Table 1, the surface resistance is slightly high, but can be lowered by e.g. adjusting the deposition conditions or by using zirconium nitride as the target.

Example 12 (COMPARATIVE EXAMPLE)

Using the same apparatus as in Example 1, the vacuum chamber was evacuated to $1 \times 10^{-5}$ Torr. A double layer film was formed as follows on a soda lime glass substrate 10 placed in the vacuum chamber. Namely, a first layer of ITO having a film thickness of 30 nm was formed by carrying out DC sputtering employing an ITO target and employing a mixed gas of argon and oxygen (oxygen: 1 vol %) as the sputtering gas. Then, in the same manner as in step 3 of Example 1, a silica film having a film thickness of 110 nm was formed. The spectral reflectance was measured in the same manner as in Example 1, and the results are shown in FIG. 13.

Example 13 (COMPARATIVE EXAMPLE)

Film formation was carried out in the same manner as in Example 12 except that the film structure was changed. Namely, after forming a titanium nitride film having a film thickness of 30 nm in the same manner as in step 1 of Example 1, a silica film having a film thickness of 100 nm was formed in the same manner as in step 3. With the obtained sample, the spectral reflectance was measured in the same manner as in Example 1, and the results are shown in FIG. 14.

Example 14 (COMPARATIVE EXAMPLE)

Film formation was carried out in the same manner as in Example 1 except that the film structure was changed. Namely, after forming a titanium nitride film having a film thickness of 26 nm in the same manner as in step 1 of Example 1, a transparent $SiN_x$ film having a film thickness of 40 nm was formed by switching the sputtering gas to a mixed gas of argon and nitrogen with 50 vol % of nitrogen at a supply power density of 1 kW/cm$^2$. Then, in the same manner as in step 3, a silica film having a film thickness of 46 nm was formed. The spectral reflectance was measured in the same manner as in Example 1, and the results are shown in FIG. 15. Further, only a transparent $SiN_x$ film of the second layer was separately formed, and the optical constant of the transparent $SiN_x$ film was measured by spectroscopic ellipsometry, whereby the refractive index at 550 nm was 1.90, and the extinction coefficient was 0.02.

Example 15 (COMPARATIVE EXAMPLE)

Film formation was carried out in the same manner as in Example 1 except that the film structure was changed. Namely, after forming a titanium nitride film of 12 nm using a mixed gas of argon and nitrogen with a 10 vol % of nitrogen as the sputtering gas in step 1 of Example 1, a transparent $SiN_x$ film having a film thickness of 5 nm was formed in the same manner as the barrier layer in Example 5 by switching the sputtering gas to a mixed gas of argon and nitrogen with 50 vol % of nitrogen. Then, in the same manner as in step 3, a silica film having a film thickness of 85 nm was formed. The spectral reflectance of the obtained light absorptive antireflection film showed a wide low reflection characteristic within the visible light range, but the luminous transmittance was 69.7%, and a low luminous transmittance was not obtained.

With respect to the light absorptive antireflectors obtained in the foregoing Examples 1 to 15, the sheet resistance measured by a non-contact electric conductivity meter, the luminous reflectance obtained from the spectral reflection curve, the luminous transmittance measured by a simple transmittance meter, the light absorptivity of the incident light from the silica film side (hereinafter referred to simply as the light absorptivity), and the wavelength range within which the reflectance is not higher than 1.0%, are shown as summarized in Table 1.

Figure 16:
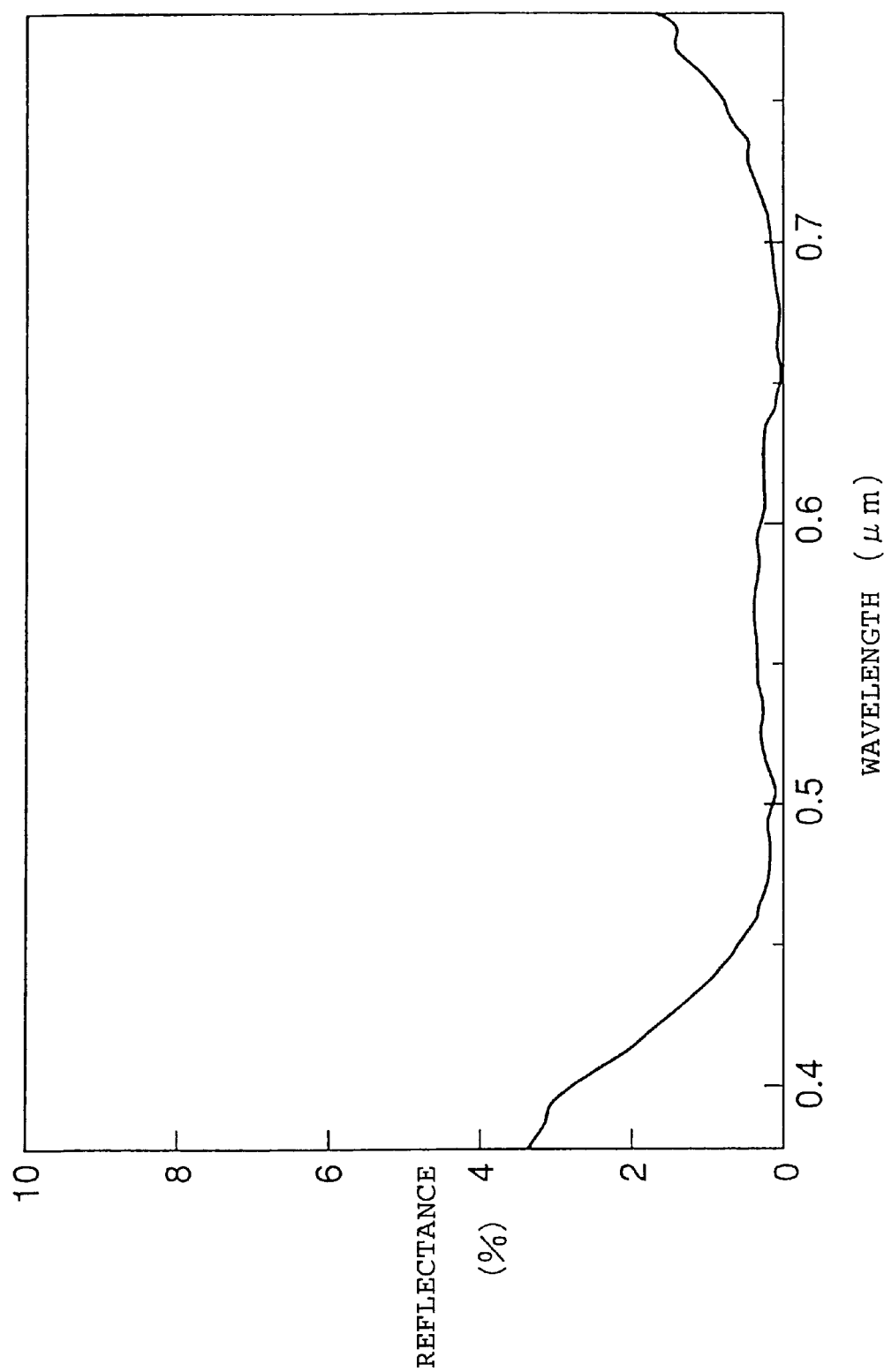
FIG. 16 is a graph showing the spectral reflectance of the light absorptive antireflector of Example 2 after heat treatment.

Further, to the light absorptive antireflection glasses of Examples 2 and 5, heat treatment at 450° C. for 30 minutes was applied twice, respectively. The spectral reflectance after the heat treatment is shown in FIGS. 16 and 17, respectively. The sheet resistance, the luminous reflectance, the luminous transmittance, the light absorptivity and the wavelength range within which the reflectance is not higher than 1.0%, as measured in the same manner as above, are shown in Table 2.

As is evident from Table 1 and FIGS. 14 to 17, the light absorptive antireflector of the present invention has excellent antireflection characteristics and low transmittance and is excellent also in heat resistance, while it has a simple film structure. Especially, Examples 1, 2, 3, 4, 5, 7, 8, 9 and 10 have excellent antireflection characteristics such that the reflectance of the incident light from the side opposite to the substrate, is not higher than 0.6% at a wavelength of from 500 to 650 nm, as is evident from the spectral reflection curves thereof (no drawing for Example 9).

When Example 12 (Comparative Example) constituted by the transparent films only is compared with the spectral reflectance curve of Example 1, it is evident that the spectral reflectance curve of Example 1 has a wider low reflection region, showing excellent antireflection characteristics.

Further, as is evident from the spectral transmittance curve and the luminous transmittance in Table 1, the light absorptive antireflector of the present invention has a low transmittance. Accordingly, when the present invention is applied to e.g. a panel glass, a face plate or a filter glass to be installed on the front surface of a display screen of e.g. CRT, the effect of improving the contrast of the display screen will be more distinct than the case of a transparent antireflection film.

Further, as is evident from these Examples, according to the present invention, by selecting the film thicknesses of the light absorptive film and the slightly absorptive $SiN_x$ film within the preferred ranges, it is possible to adjust the light absorptivity of the incident light from the silica film side (the side opposite to the substrate) of the light absorptive antireflector of the present invention, within a range of from 30 to 65%.

Further, as is evident from the comparison of Example 13 with Examples 1 to 10, a very wide low reflection wavelength region can be obtained by inserting a slightly absorptive $SiN_x$ film as a second layer between the absorptive film and the low refractive index film, as in Examples 1 to 10. When the same substrate is used, and a light absorptive film (the first layer) of the same material is used in the same film thickness, if a slightly absorptive $SiN_x$ film is employed as the second layer as in the present invention, as compared with a case where a transparent $SiN_x$ film is employed, the value obtained by dividing the wavelength on the long wavelength side in the wavelength range where the reflectance is not higher than 1% by the wavelength on the short wavelength side (wavelength on the long wavelength side/ wavelength on the short wavelength side) can be made to have a large value. Namely, it is possible to obtain a wide low reflection wavelength region. Further, when a transparent $SiN_x$ film is used for the second layer as in Example 13, it is difficult to obtain the spectral reflection spectrum having the local maximum value at the center portion of the visible light region, as in the present invention, and accordingly, the reflection color is limited.

Further, as is evident from the comparison of Example 14 with Examples 1 to 3 and 5, when $TiN_x$, $SiN_x$ and $SiO_2$ are formed on the same glass, the low reflection region can be broadened when $SiN_x$ is the slightly absorptive film.

As is evident from the comparison of Example 15 with Examples 1 to 10, it is possible to obtain a low luminous transmittance while maintaining a very wide low reflection wavelength region by inserting a slightly absorptive $SiN_x$ film as a second layer between the absorptive film and the low refractive index film, as in Examples 1 to 10. Namely, it is possible to substantially broaden the range of obtainable transmittance toward the low transmittance side.

Figure 18:
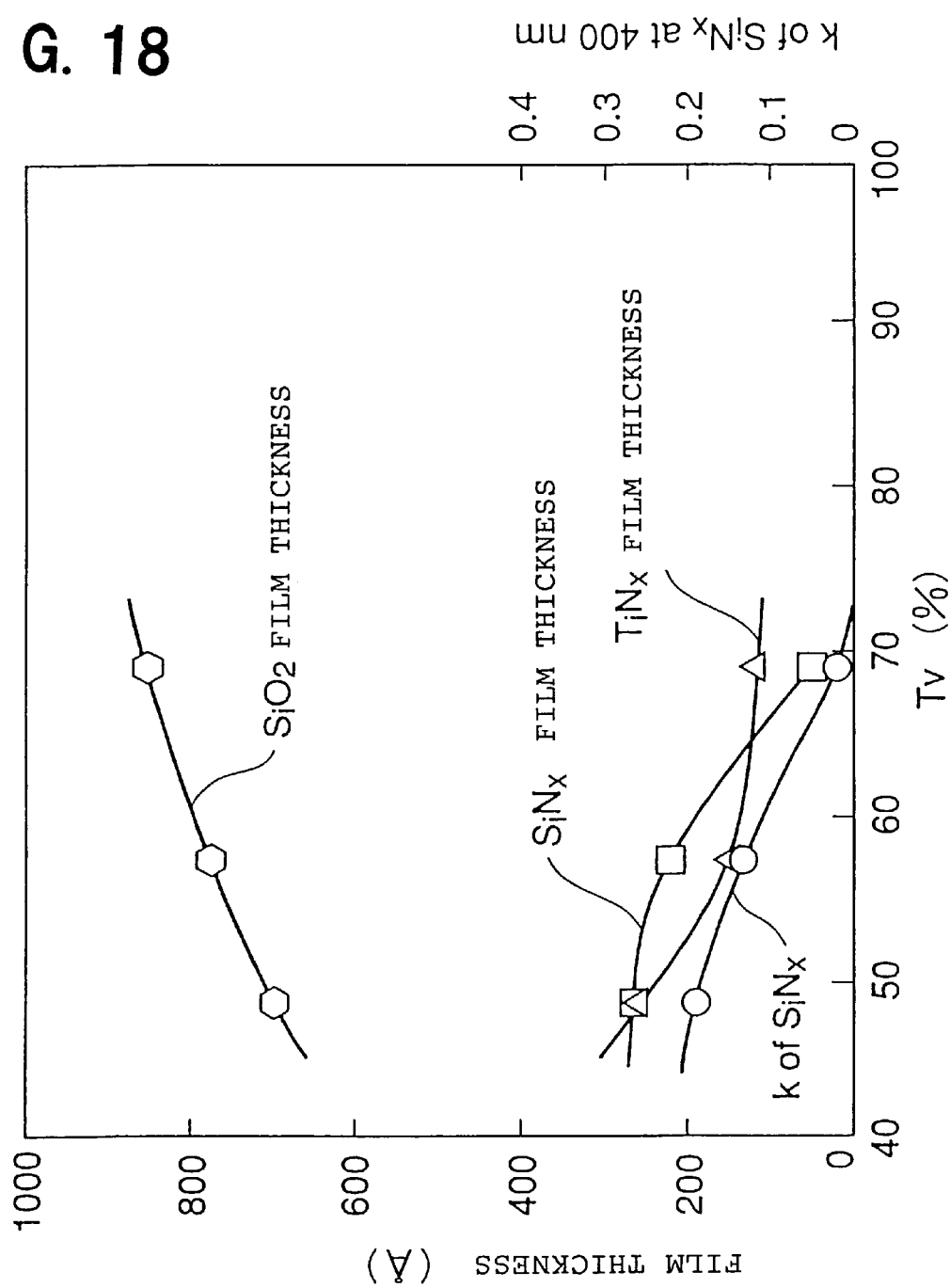
FIG. 18 is a graph showing an interrelation between the final transmittance and the optimum film thickness of the light absorptive film, the slightly absorptive film, the low refractive index film, and the extinction coefficient at 400 nm of the slight absorptive film, in the present invention.

FIG. 18 is a graph showing a relation between the transmittance within a range of 45–75% and the optimum film thickness of the titanium nitride film (the light absorptive film), the slightly absorptive $SiN_x$ film (the slightly absorptive film), the silica film (the low refractive index film) and the optimum value of the extinction coefficient at 400 nm of the slightly absorptive $SiN_x$ film, when soda lime glass was employed as the substrate. From this Figure, the deposition conditions of the respective layers to obtain the desired transmittance can be predicted. Further, from this Figure, it is evident that in the transmittance region suitable for the application of the light absorptive antireflector of the present invention, the relation of the film thicknesses of the respective layers is preferably in a relation of the first layer ≦ the second layer < the third layer (particularly, the first layer < the second layer < the third layer).

Accordingly, it is possible to preliminarily design how to form the respective layers in order to obtain the desired final total transmittance when a panel glass with high transmittance (e.g. about 80%) is employed as the substrate.

The transmittance of the light absorptive antireflector of the present invention can be continuously changed, and accordingly, a cathode ray tube having a desired final transmittance can be obtained without adjusting the transmittance of the panel base material. Accordingly, it is not necessary to change the panel base material depending upon the type of the cathode ray tube, such being very advantageous from the viewpoint of the production.

Further, as is evident from the above various Examples and the spectral reflectance spectra thereof, the size of the local maximum at the center portion of the visible light region in the spectral reflection spectrum can optionally be selected by properly selecting the film thickness of the slightly absorptive $SiN_x$ film, whereby together with the film thickness of the silica layer, selection of the reflection color can be freely carried out within a substantial range.

Further, as is evident from the comparison of FIGS. 5 and 16 of Example 2, the antireflection performance is not impaired so much even by heat treatment, since the slightly absorptive $SiN_x$ film partially has a function as a barrier layer. Further, as is evident from the comparison of FIGS. 8 and 17 of Example 5, one having 5 nm of a transparent $SiN_x$ film inserted as a barrier layer, exhibits a further improved heat treatment resistance characteristic. Further, as is evident from Examples 7 to 10, even with a plastic substrate, by carrying out a proper pretreatment (plasma treatment), practically sufficient adhesion strength can be obtained while maintaining the antireflection characteristics.

TABLE 1

| Example No. | Surface resistance (µ/□) | Luminous reflectance (%) | Luminous transmittance (%) | Light absorptivity (%) | Wavelength range where the reflectance is not higher than 1% (nm) |
|---|---|---|---|---|---|
| 1 | 230 | 0.03 | 48.1 | 50.9 | 426–716 |
| 2 | 210 | 0.12 | 47.5 | 51.4 | 408–763 |
| 3 | 220 | 0.38 | 47.1 | 51.5 | At most 380–at least 780 |
| 4 | 250 | 0.16 | 57.0 | 41.7 | 445–at least 780 |
| 5 | 210 | 0.22 | 47.0 | 51.8 | 413–at least 780 |
| 6 | 200 | 0.49 | 46.7 | 51.8 | At most 380–at least 780 |
| 7 | 220 | 0.27 | 49.6 | 49.1 | 460–672 |
| 8 | 200 | 0.06 | 48.7 | 50.2 | 443–740 |
| 9 | 210 | 0.18 | 48.8 | 50.0 | 455–758 |
| 10 | 280 | 0.30 | 57.0 | 41.7 | 450–at least 780 |
| 11 | 990 | 0.20 | 52.0 | 46.8 | 443–721 |
| 12 | 220 | 0.82 | 94.7 | 0.4 | 522–645 |
| 13 | 220 | 1.22 | 48.7 | 49.1 | — |
| 14 | 230 | 0.11 | 49.8 | 49.1 | 431–698 |
| 15 | 300 | 0.10 | 69.7 | 28.2 | 417–771 |

TABLE 2

| Example No. | Surface resistance (Ω/□) | Luminous reflectance (%) | Luminous transmittance (%) | Light absorptivity (%) | Wavelength range where the reflectance is not higher than 1% (nm) |
|---|---|---|---|---|---|
| 2 | 380 | 0.31 | 55.2 | 43.2 | 438–757 |
| 5 | 320 | 0.35 | 53.6 | 44.8 | 436–at least 780 |

INDUSTRIAL APPLICABILITY

The light absorptive antireflector of the present invention has a sufficient low reflection property in a wide range of wavelength region and has degrees of freedom in the transmittance and the reflection color. Further, the light absorptive antireflector of the present invention has a small number of layers and as such, is advantageous from the viewpoint of the productivity.

Further, by reducing the transmittance, the contrast can be increased, and the resistance may be at most 1 kΩ/□, and it has an electromagnetic wave shielding property.

Further, with the light absorptive antireflector of the present invention, the number of film interfaces is small, and it is excellent in the mechanical strength such as scratch resistance, or heat resistance.

Further, when a DC sputtering method is employed as a film forming method in the present invention, there is a merit such that the process is stable or a large area treatment is easy, and the light absorptive antireflector can be produced at a low cost.

Further, the light absorptive antireflector according to the present invention, is excellent in heat resistance and sufficiently durable against heat treatment of a level required for panel glass of a cathode ray tube, and accordingly, it is expected to be applied not only to panel glass of a cathode ray tube but also to other applications where heat resistance is required.

We claim:

1. A light absorptive antireflector comprising:
a substrate;
a first layer of a light absorptive film;
a second layer made of a material that has slight absorption within a wavelength range of 400 to 700 nm, has an extinction coefficient being larger on a short wavelength side, within a wavelength range of 400 to 700 nm, and has an extinction coefficient in the range of 0.05 to 0.6, at a wavelength of 400 nm; and
a third layer made of a material that is transparent within a wavelength range of 400 to 700 nm and has a refractive index of less than 1.55, wherein the layers are formed sequentially on the substrate.

2. The light absorptive antireflector according with claim 1, wherein the second layer is made of a material that has a refractive index of at least 1.8.

3. The light absorptive antireflector according with claim 1, wherein the second layer is made of a material containing silicon nitride as the main component, a material containing bismuth oxide as the main component or a material containing chromium oxide as the main component.

4. The light absorptive antireflector according with claim 1, wherein the first layer is made of a material containing a nitride of at least one metal selected from the group consisting of titanium, zirconium and hafnium, as the main component.

5. The light absorptive antireflector according with claim 1, wherein the third layer is made of a material containing silicon and oxygen.

6. The light absorptive anti reflector according with claim 1, wherein the geometrical film thickness of the first layer is from 5 to 40 nm, the geometrical film thickness of the second layer is from 2 to 40 nm, and the geometrical film thickness of the third layer is from 40 to 100 nm.

7. The light absorptive antireflector according with claim 1, which has a layer containing aluminum nitride or transparent silicon nitride as the main component between the second layer and the third layer.

8. The light absorptive antireflector according with claim 1, wherein the light absorptivity of the light absorptive antireflector, within a wavelength range of 400 to 700 nm, is from 30 to 65%.

9. The light absorptive antireflector according with claim 1, wherein the reflectance of incident light from the third layer side is at most 0.6%, within a wavelength range of 500 to 650 nm.

10. The light absorptive antireflector according with claim 1, wherein the substrate is a glass substrate, a plastic substrate or a plastic film constituting a front surface of a display panel.

11. The light absorptive antireflector according with claim 1, which has a layer containing silicon nitride as the main component between the substrate and the first layer, wherein the substrate is made of an organic material.

12. A method for producing a light absorptive antireflector, comprising:

applying a plasma treatment to a substrate made of an organic material;

forming a first layer of a light absorptive film on the substrate after the applying step;

forming on the first layer a second layer made of a material which has slight absorption, within a wavelength range of 400 to 700 nm, and an extinction coefficient being larger on a short wavelength side within a wavelength range of 400 to 700 nm; and forming on the second layer a third layer made of a material which is transparent within a wavelength range of 400 to 700 nm and has a refractive index of less than 1.55.

13. The method according to claim 12, wherein the plasma treatment is carried out by setting the substrate in a vacuum chamber and then applying a radio frequency electric power to an electrode disposed on the rear side of the substrate for a treating time t (sec) which satisfies the formula, $$\frac{2 \cdot P \cdot t}{V \cdot e \cdot \pi} > 5 \times 10^{15}$$

where e is an elementary electric charge of $1.6 \times 10^{-19}$ (C), P is the electric power (W) applied to the substrate surface, and V is the self-bias potential (V) of the electrode.

* * * * *